(12) United States Patent
Park et al.

(10) Patent No.: US 9,317,072 B2
(45) Date of Patent: Apr. 19, 2016

(54) HINGE MECHANISM WITH PRESET POSITIONS

(71) Applicant: Microsoft Technology Licensing, LLC, Redmond, WA (US)

(72) Inventors: Daniel C. Park, Woodinville, WA (US); Yi-Min Huang, Issaquah, WA (US); Jan Raken, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 14/166,596

(22) Filed: Jan. 28, 2014

(65) Prior Publication Data

US 2015/0212553 A1 Jul. 30, 2015

(51) Int. Cl.
*G06F 1/16* (2006.01)

(52) U.S. Cl.
CPC ......... *G06F 1/1681* (2013.01); *Y10T 16/53838* (2015.01)

(58) Field of Classification Search
CPC .................................................... G06F 1/1681
USPC ............... 361/679.01–679.3, 679.55–679.59; 16/277, 303, 308, 341
See application file for complete search history.

(56) References Cited

U.S. PATENT DOCUMENTS

| | | | |
|---|---|---|---|
| 578,325 A | 3/1897 | Fleming | |
| 4,046,975 A | 9/1977 | Seeger, Jr. | |
| 4,065,649 A | 12/1977 | Carter et al. | |
| 4,243,861 A | 1/1981 | Strandwitz | |
| 4,302,648 A | 11/1981 | Sado et al. | |
| 4,317,013 A | 2/1982 | Larson | |
| 4,365,130 A | 12/1982 | Christensen | |
| 4,492,829 A | 1/1985 | Rodrique | |
| 4,527,021 A | 7/1985 | Morikawa et al. | |
| 4,559,426 A | 12/1985 | Van Zeeland et al. | |
| 4,577,822 A | 3/1986 | Wilkerson | |
| 4,588,187 A | 5/1986 | Dell | |
| 4,607,147 A | 8/1986 | Ono et al. | |

(Continued)

FOREIGN PATENT DOCUMENTS

| | | |
|---|---|---|
| CA | 990023 | 6/1976 |
| CN | 101500388 | 8/2009 |

(Continued)

OTHER PUBLICATIONS

"Corrected Notice of Allowance", U.S. Appl. No. 13/471,030, Sep. 30, 2014, 2 pages.

(Continued)

*Primary Examiner* — Nidhi Thaker
(74) *Attorney, Agent, or Firm* — Jeremy Snodgrass; Judy Yee; Micky Minhas

(57) ABSTRACT

A hinge mechanism with preset positions is described. In at least some implementations, the hinge mechanism enables a support component to be adjustably attached to an apparatus, such as a computing device. The support component can be rotated via the hinge mechanism to various positions to provide support for different orientations of the computing device. In at least some embodiments, a hinge mechanism utilizes preset hinge positions that enable a support component to be placed at different preset positions. For instance, the hinge mechanism is configured such that an attached support component tends to "snap" into various preset positions.

20 Claims, 20 Drawing Sheets

(56) References Cited

U.S. PATENT DOCUMENTS

| | | | |
|---|---|---|---|
| 4,651,133 A | 3/1987 | Ganesan et al. | |
| 4,735,394 A | 4/1988 | Facco | |
| 5,008,497 A | 4/1991 | Asher | |
| 5,107,401 A | 4/1992 | Youn | |
| 5,128,829 A | 7/1992 | Loew | |
| 5,220,521 A | 6/1993 | Kikinis | |
| 5,235,495 A | 8/1993 | Blair et al. | |
| 5,283,559 A | 2/1994 | Kalendra et al. | |
| 5,331,443 A | 7/1994 | Stanisci | |
| 5,375,076 A | 12/1994 | Goodrich et al. | |
| 5,480,118 A | 1/1996 | Cross | |
| 5,546,271 A | 8/1996 | Gut et al. | |
| 5,548,477 A | 8/1996 | Kumar et al. | |
| 5,558,577 A | 9/1996 | Kato | |
| 5,681,220 A | 10/1997 | Bertram et al. | |
| 5,737,183 A | 4/1998 | Kobayashi et al. | |
| 5,745,376 A | 4/1998 | Barker et al. | |
| 5,748,114 A | 5/1998 | Koehn | |
| 5,781,406 A | 7/1998 | Hunte | |
| 5,807,175 A | 9/1998 | Davis et al. | |
| 5,818,361 A | 10/1998 | Acevedo | |
| 5,828,770 A | 10/1998 | Leis et al. | |
| 5,842,027 A | 11/1998 | Oprescu et al. | |
| 5,861,990 A | 1/1999 | Tedesco | |
| 5,874,697 A | 2/1999 | Selker et al. | |
| 5,926,170 A | 7/1999 | Oba | |
| 5,971,635 A | 10/1999 | Wise | |
| 6,002,389 A | 12/1999 | Kasser | |
| 6,002,581 A | 12/1999 | Lindsey | |
| 6,005,209 A | 12/1999 | Burleson et al. | |
| 6,012,714 A | 1/2000 | Worley et al. | |
| 6,040,823 A | 3/2000 | Seffernick et al. | |
| 6,044,717 A | 4/2000 | Biegelsen et al. | |
| 6,061,644 A | 5/2000 | Leis | |
| 6,112,797 A | 9/2000 | Colson et al. | |
| 6,141,388 A | 10/2000 | Servais et al. | |
| 6,178,085 B1 | 1/2001 | Leung | |
| 6,178,443 B1 | 1/2001 | Lin | |
| 6,254,105 B1 | 7/2001 | Rinde et al. | |
| 6,279,060 B1 | 8/2001 | Luke et al. | |
| 6,329,617 B1 | 12/2001 | Burgess | |
| 6,344,791 B1 | 2/2002 | Armstrong | |
| 6,380,497 B1 | 4/2002 | Hashimoto et al. | |
| 6,437,682 B1 | 8/2002 | Vance | |
| 6,511,378 B1 | 1/2003 | Bhatt et al. | |
| 6,532,147 B1 | 3/2003 | Christ, Jr. | |
| 6,543,949 B1 | 4/2003 | Ritchey et al. | |
| 6,565,439 B2 | 5/2003 | Shinohara et al. | |
| 6,597,347 B1 | 7/2003 | Yasutake | |
| 6,600,121 B1 | 7/2003 | Olodort et al. | |
| 6,603,408 B1 | 8/2003 | Gaba | |
| 6,617,536 B2 | 9/2003 | Kawaguchi | |
| 6,651,943 B2 | 11/2003 | Cho et al. | |
| 6,685,369 B2 | 2/2004 | Lien | |
| 6,695,273 B2 | 2/2004 | Iguchi | |
| 6,704,864 B1 | 3/2004 | Philyaw | |
| 6,721,019 B2 | 4/2004 | Kono et al. | |
| 6,725,318 B1 | 4/2004 | Sherman et al. | |
| 6,774,888 B1 | 8/2004 | Genduso | |
| 6,776,546 B2 | 8/2004 | Kraus et al. | |
| 6,781,819 B2 | 8/2004 | Yang et al. | |
| 6,784,869 B1 | 8/2004 | Clark et al. | |
| 6,813,143 B2 | 11/2004 | Makela | |
| 6,819,316 B2 | 11/2004 | Schulz et al. | |
| 6,856,506 B2 | 2/2005 | Doherty et al. | |
| 6,856,789 B2 | 2/2005 | Pattabiraman et al. | |
| 6,861,961 B2 | 3/2005 | Sandbach et al. | |
| 6,914,197 B2 | 7/2005 | Doherty et al. | |
| 6,950,950 B2 | 9/2005 | Sawyers et al. | |
| 6,970,957 B1 | 11/2005 | Oshins et al. | |
| 6,976,799 B2 | 12/2005 | Kim et al. | |
| 7,051,149 B2 | 5/2006 | Wang et al. | |
| 7,083,295 B1 | 8/2006 | Hanna | |
| 7,091,436 B2 | 8/2006 | Serban | |
| 7,099,149 B2 | 8/2006 | Krieger et al. | |
| 7,106,222 B2 | 9/2006 | Ward et al. | |
| 7,123,292 B1 | 10/2006 | Seeger et al. | |
| 7,152,985 B2 | 12/2006 | Benitez et al. | |
| D535,292 S | 1/2007 | Shi et al. | |
| 7,194,662 B2 | 3/2007 | Do et al. | |
| 7,213,991 B2 | 5/2007 | Chapman et al. | |
| 7,239,505 B2 | 7/2007 | Keely | |
| 7,277,087 B2 | 10/2007 | Hill et al. | |
| 7,301,759 B2 | 11/2007 | Hsiung | |
| 7,447,934 B2 | 11/2008 | Dasari et al. | |
| 7,469,386 B2 | 12/2008 | Bear et al. | |
| 7,486,165 B2 | 2/2009 | Ligtenberg et al. | |
| 7,499,037 B2 | 3/2009 | Lube | |
| 7,502,803 B2 | 3/2009 | Culter et al. | |
| 7,542,052 B2 | 6/2009 | Solomon et al. | |
| 7,558,594 B2 | 7/2009 | Wilson | |
| 7,559,834 B1 | 7/2009 | York | |
| RE40,891 E | 9/2009 | Yasutake | |
| 7,594,638 B2 | 9/2009 | Chan et al. | |
| 7,636,921 B2 | 12/2009 | Louie | |
| 7,639,876 B2 | 12/2009 | Clary et al. | |
| 7,656,392 B2 | 2/2010 | Bolender | |
| 7,729,493 B2 | 6/2010 | Krieger et al. | |
| 7,731,147 B2 | 6/2010 | Rha | |
| 7,733,326 B1 | 6/2010 | Adiseshan | |
| 7,761,119 B2 | 7/2010 | Patel | |
| 7,777,972 B1 | 8/2010 | Chen et al. | |
| 7,782,342 B2 | 8/2010 | Koh | |
| 7,813,715 B2 | 10/2010 | McKillop et al. | |
| 7,822,338 B2 | 10/2010 | Wernersson | |
| 7,865,639 B2 | 1/2011 | McCoy et al. | |
| 7,884,807 B2 | 2/2011 | Hovden et al. | |
| D636,397 S | 4/2011 | Green | |
| 7,928,964 B2 | 4/2011 | Kolmykov-Zotov et al. | |
| 7,945,717 B2 | 5/2011 | Rivalsi | |
| 7,967,462 B2 | 6/2011 | Ogiro et al. | |
| 7,973,771 B2 | 7/2011 | Geaghan | |
| 7,978,281 B2 | 7/2011 | Vergith et al. | |
| 8,016,255 B2 | 9/2011 | Lin | |
| 8,053,688 B2 | 11/2011 | Conzola et al. | |
| 8,065,624 B2 | 11/2011 | Morin et al. | |
| 8,069,356 B2 | 11/2011 | Rathi et al. | |
| 8,090,885 B2 | 1/2012 | Callaghan et al. | |
| 8,098,233 B2 | 1/2012 | Hotelling et al. | |
| 8,115,499 B2 | 2/2012 | Osoinach et al. | |
| 8,117,362 B2 | 2/2012 | Rodriguez et al. | |
| 8,118,274 B2 | 2/2012 | McClure et al. | |
| 8,130,203 B2 | 3/2012 | Westerman | |
| 8,154,524 B2 | 4/2012 | Wilson et al. | |
| 8,162,282 B2 | 4/2012 | Hu et al. | |
| D659,139 S | 5/2012 | Gengler | |
| 8,169,421 B2 | 5/2012 | Wright et al. | |
| 8,229,509 B2 | 7/2012 | Paek et al. | |
| 8,229,522 B2 | 7/2012 | Kim et al. | |
| 8,231,099 B2 | 7/2012 | Chen | |
| 8,240,007 B2 * | 8/2012 | Duan | H04M 1/0216 16/303 |
| 8,243,432 B2 * | 8/2012 | Duan | H04M 1/04 248/188.8 |
| 8,245,354 B2 * | 8/2012 | Duan | H04M 1/0216 16/277 |
| 8,248,791 B2 | 8/2012 | Wang et al. | |
| 8,255,708 B1 | 8/2012 | Zhang | |
| 8,267,368 B2 * | 9/2012 | Torii | F16M 13/00 248/188.8 |
| 8,274,784 B2 | 9/2012 | Franz et al. | |
| 8,279,589 B2 | 10/2012 | Kim | |
| 8,322,290 B1 | 12/2012 | Mignano | |
| 8,387,938 B2 | 3/2013 | Lin | |
| 8,416,559 B2 | 4/2013 | Agata et al. | |
| 8,424,160 B2 | 4/2013 | Chen | |
| 8,498,100 B1 | 7/2013 | Whitt, III et al. | |
| 8,514,568 B2 | 8/2013 | Qiao et al. | |
| 8,520,371 B2 | 8/2013 | Peng et al. | |
| 8,543,227 B1 | 9/2013 | Perek et al. | |
| 8,548,608 B2 | 10/2013 | Perek et al. | |
| 8,564,944 B2 | 10/2013 | Whitt, III et al. | |
| 8,570,725 B2 | 10/2013 | Whitt, III et al. | |
| 8,610,015 B2 | 12/2013 | Whitt et al. | |

(56) References Cited

U.S. PATENT DOCUMENTS

| | | |
|---|---|---|
| 8,614,666 B2 | 12/2013 | Whitman et al. |
| 8,744,070 B2 | 6/2014 | Zhang et al. |
| 8,744,391 B2 | 6/2014 | Tenbrook et al. |
| 8,767,388 B2 | 7/2014 | Ahn et al. |
| 8,797,765 B2 | 8/2014 | Lin et al. |
| 8,891,232 B2 | 11/2014 | Wang |
| 8,908,858 B2 | 12/2014 | Chiu et al. |
| 8,922,996 B2 * | 12/2014 | Yeh .................... H04M 1/0202 361/679.3 |
| 8,934,221 B2 | 1/2015 | Guo |
| 8,939,422 B2 | 1/2015 | Liu et al. |
| 8,964,376 B2 | 2/2015 | Chen |
| 9,116,550 B2 | 8/2015 | Siddiqui et al. |
| 9,134,808 B2 | 9/2015 | Siddiqui et al. |
| 2002/0134828 A1 | 9/2002 | Sandbach et al. |
| 2003/0163611 A1 | 8/2003 | Nagao |
| 2003/0197687 A1 | 10/2003 | Shetter |
| 2004/0056843 A1 | 3/2004 | Lin et al. |
| 2004/0258924 A1 | 12/2004 | Berger et al. |
| 2004/0268000 A1 | 12/2004 | Barker et al. |
| 2005/0030728 A1 | 2/2005 | Kawashima et al. |
| 2005/0052831 A1 | 3/2005 | Chen |
| 2005/0057515 A1 | 3/2005 | Bathiche |
| 2005/0059489 A1 | 3/2005 | Kim |
| 2005/0134717 A1 | 6/2005 | Misawa |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0187216 A1 | 8/2006 | Trent, Jr. et al. |
| 2006/0195522 A1 | 8/2006 | Miyazaki |
| 2006/0227393 A1 | 10/2006 | Herloski |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0145945 A1 | 6/2007 | McGinley et al. |
| 2007/0182663 A1 | 8/2007 | Biech |
| 2007/0182722 A1 | 8/2007 | Hotelling et al. |
| 2007/0200830 A1 | 8/2007 | Yamamoto |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0236873 A1 | 10/2007 | Yukawa et al. |
| 2007/0247432 A1 | 10/2007 | Oakley |
| 2007/0260892 A1 | 11/2007 | Paul et al. |
| 2007/0283179 A1 | 12/2007 | Burnett et al. |
| 2008/0005423 A1 | 1/2008 | Jacobs et al. |
| 2008/0104437 A1 | 5/2008 | Lee |
| 2008/0151478 A1 | 6/2008 | Chern |
| 2008/0158185 A1 | 7/2008 | Westerman |
| 2008/0174570 A1 | 7/2008 | Jobs et al. |
| 2008/0186660 A1 | 8/2008 | Yang |
| 2008/0228969 A1 | 9/2008 | Cheah et al. |
| 2008/0238884 A1 | 10/2008 | Harish |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0073957 A1 | 3/2009 | Newland et al. |
| 2009/0083562 A1 | 3/2009 | Park et al. |
| 2009/0140985 A1 | 6/2009 | Liu |
| 2009/0195497 A1 | 8/2009 | Fitzgerald et al. |
| 2009/0231275 A1 | 9/2009 | Odgers |
| 2009/0244009 A1 | 10/2009 | Staats et al. |
| 2009/0244872 A1 | 10/2009 | Yan |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy et al. |
| 2010/0051432 A1 | 3/2010 | Lin et al. |
| 2010/0053534 A1 | 3/2010 | Hsieh et al. |
| 2010/0077237 A1 | 3/2010 | Sawyers |
| 2010/0085321 A1 | 4/2010 | Pundsack |
| 2010/0102182 A1 | 4/2010 | Lin |
| 2010/0103112 A1 | 4/2010 | Yoo et al. |
| 2010/0123686 A1 | 5/2010 | Klinghult et al. |
| 2010/0133398 A1 | 6/2010 | Chiu et al. |
| 2010/0142130 A1 | 6/2010 | Wang et al. |
| 2010/0149111 A1 | 6/2010 | Olien |
| 2010/0149377 A1 | 6/2010 | Shintani et al. |
| 2010/0154171 A1 | 6/2010 | Lombardi et al. |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0222110 A1 | 9/2010 | Kim et al. |
| 2010/0231556 A1 | 9/2010 | Mines et al. |
| 2010/0250988 A1 | 9/2010 | Okuda et al. |
| 2010/0259876 A1 | 10/2010 | Kim |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0309617 A1 | 12/2010 | Wang et al. |
| 2010/0315348 A1 | 12/2010 | Jellicoe et al. |
| 2010/0325155 A1 | 12/2010 | Skinner et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0055407 A1 | 3/2011 | Lydon et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102752 A1 | 5/2011 | Chen et al. |
| 2011/0134032 A1 | 6/2011 | Chiu et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0170289 A1 | 7/2011 | Allen et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0231682 A1 | 9/2011 | Kakish et al. |
| 2011/0248152 A1 | 10/2011 | Svajda et al. |
| 2011/0248920 A1 | 10/2011 | Larsen |
| 2011/0261001 A1 | 10/2011 | Liu |
| 2011/0265287 A1 | 11/2011 | Li et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0304577 A1 | 12/2011 | Brown |
| 2011/0316807 A1 | 12/2011 | Corrion |
| 2012/0007821 A1 | 1/2012 | Zaliva |

(56) References Cited

U.S. PATENT DOCUMENTS

| | | | |
|---|---|---|---|
| 2012/0020019 A1* | 1/2012 | Chen | G06F 1/1656 361/679.59 |
| 2012/0023459 A1 | 1/2012 | Westerman | |
| 2012/0024682 A1 | 2/2012 | Huang et al. | |
| 2012/0044179 A1 | 2/2012 | Hudson | |
| 2012/0047368 A1 | 2/2012 | Chinn et al. | |
| 2012/0050975 A1 | 3/2012 | Garelli et al. | |
| 2012/0068919 A1 | 3/2012 | Lauder et al. | |
| 2012/0075249 A1 | 3/2012 | Hoch | |
| 2012/0092279 A1 | 4/2012 | Martin | |
| 2012/0094257 A1 | 4/2012 | Pillischer et al. | |
| 2012/0099749 A1 | 4/2012 | Rubin et al. | |
| 2012/0113579 A1 | 5/2012 | Agata et al. | |
| 2012/0117409 A1 | 5/2012 | Lee et al. | |
| 2012/0127118 A1 | 5/2012 | Nolting et al. | |
| 2012/0140396 A1 | 6/2012 | Zeliff et al. | |
| 2012/0145525 A1 | 6/2012 | Ishikawa | |
| 2012/0161406 A1 | 6/2012 | Mersky | |
| 2012/0162693 A1 | 6/2012 | Ito | |
| 2012/0175487 A1 | 7/2012 | Goto | |
| 2012/0182242 A1 | 7/2012 | Lindahl et al. | |
| 2012/0182743 A1 | 7/2012 | Chou | |
| 2012/0194448 A1 | 8/2012 | Rothkopf | |
| 2012/0224073 A1 | 9/2012 | Miyahara | |
| 2012/0246377 A1 | 9/2012 | Bhesania | |
| 2012/0256959 A1 | 10/2012 | Ye et al. | |
| 2012/0274811 A1 | 11/2012 | Bakin | |
| 2012/0300275 A1 | 11/2012 | Vilardell et al. | |
| 2012/0312955 A1 | 12/2012 | Randolph | |
| 2012/0326003 A1 | 12/2012 | Solow et al. | |
| 2013/0009413 A1 | 1/2013 | Chiu et al. | |
| 2013/0015311 A1* | 1/2013 | Kim | H05K 5/0234 248/393 |
| 2013/0063873 A1 | 3/2013 | Wodrich et al. | |
| 2013/0088431 A1 | 4/2013 | Ballagas et al. | |
| 2013/0106766 A1 | 5/2013 | Yilmaz et al. | |
| 2013/0162554 A1 | 6/2013 | Lauder et al. | |
| 2013/0227836 A1 | 9/2013 | Whitt, III | |
| 2013/0228023 A1 | 9/2013 | Drasnin | |
| 2013/0228433 A1 | 9/2013 | Shaw | |
| 2013/0228434 A1 | 9/2013 | Whitt, III | |
| 2013/0228439 A1 | 9/2013 | Whitt, III | |
| 2013/0229100 A1 | 9/2013 | Siddiqui | |
| 2013/0229335 A1 | 9/2013 | Whitman | |
| 2013/0229347 A1 | 9/2013 | Lutz, III | |
| 2013/0229350 A1 | 9/2013 | Shaw et al. | |
| 2013/0229351 A1 | 9/2013 | Whitt | |
| 2013/0229354 A1 | 9/2013 | Whitt, III et al. | |
| 2013/0229363 A1 | 9/2013 | Whitman | |
| 2013/0229366 A1 | 9/2013 | Dighde | |
| 2013/0229380 A1 | 9/2013 | Lutz, III | |
| 2013/0229534 A1 | 9/2013 | Panay | |
| 2013/0229568 A1 | 9/2013 | Belesiu | |
| 2013/0229570 A1 | 9/2013 | Beck et al. | |
| 2013/0229756 A1 | 9/2013 | Whitt, III | |
| 2013/0229757 A1 | 9/2013 | Whitt, III et al. | |
| 2013/0229758 A1 | 9/2013 | Belesiu | |
| 2013/0229759 A1 | 9/2013 | Whitt, III | |
| 2013/0229760 A1 | 9/2013 | Whitt, III | |
| 2013/0229761 A1 | 9/2013 | Shaw | |
| 2013/0229762 A1 | 9/2013 | Whitt, III | |
| 2013/0229773 A1 | 9/2013 | Siddiqui et al. | |
| 2013/0230346 A1 | 9/2013 | Shaw | |
| 2013/0231755 A1 | 9/2013 | Perek | |
| 2013/0232280 A1 | 9/2013 | Perek | |
| 2013/0232348 A1 | 9/2013 | Oler | |
| 2013/0232349 A1 | 9/2013 | Oler | |
| 2013/0232353 A1 | 9/2013 | Belesiu | |
| 2013/0232571 A1 | 9/2013 | Belesiu | |
| 2013/0300590 A1 | 11/2013 | Dietz | |
| 2013/0300647 A1 | 11/2013 | Drasnin | |
| 2013/0301199 A1 | 11/2013 | Whitt | |
| 2013/0301206 A1 | 11/2013 | Whitt | |
| 2013/0304941 A1 | 11/2013 | Drasnin | |
| 2013/0321992 A1 | 12/2013 | Liu et al. | |
| 2013/0335891 A1 | 12/2013 | Chen et al. | |
| 2013/0342976 A1 | 12/2013 | Chung | |
| 2014/0029180 A1 | 1/2014 | Nishimura et al. | |
| 2014/0036430 A1 | 2/2014 | Wroblewski et al. | |
| 2014/0083883 A1 | 3/2014 | Elias | |
| 2014/0085814 A1 | 3/2014 | Kielland | |
| 2014/0132550 A1 | 5/2014 | McCracken et al. | |
| 2014/0167585 A1 | 6/2014 | Kuan et al. | |
| 2014/0293534 A1 | 10/2014 | Siddiqui | |
| 2015/0378392 A1 | 12/2015 | Siddiqui et al. | |

FOREIGN PATENT DOCUMENTS

| | | |
|---|---|---|
| CN | 201853163 | 6/2011 |
| CN | 202441167 | 9/2012 |
| CN | 203606723 | 5/2014 |
| DE | 202010005274 | 7/2010 |
| EP | 1223722 | 7/2002 |
| EP | 1591891 | 11/2005 |
| EP | 2353978 | 8/2011 |
| JP | 10326124 | 12/1998 |
| JP | 1173239 | 3/1999 |
| JP | 2004038950 | 2/2004 |
| KR | 1020110087178 | 8/2011 |
| WO | WO-9919995 | 4/1999 |
| WO | WO-2009034484 | 3/2009 |

OTHER PUBLICATIONS

"Notice of Allowance", U.S. Appl. No. 13/471,030, Sep. 5, 2014, 6 pages.

"Non-Final Office Action", U.S. Appl. No. 13/471,030, Jan. 15, 2015, 7 pages.

"Non-Final Office Action", U.S. Appl. No. 13/852,848, Mar. 26, 2015, 7 pages.

"Notice of Allowance", U.S. Appl. No. 13/471,030, Apr. 6, 2015, 6 pages.

"Accessing Device Sensors", retrieved from <https://developer.palm.com/content/api/dev-guide/pdk/accessing-device-sensors.html> on May 25, 2012, 2011, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.

"Advanced Configuration and Power Management Specification", Intel Corporation, Microsoft Corporation, Toshiba Corp. Revision 1, Dec. 22, 1996, 364 pages.

"Basic Cam Motion Curves", Retrieved From: <http://ocw.metu.edu.tr/pluginfile.php/6886/mod_resource/content/1/ch8/8-3.htm> Nov. 22, 2013, Middle East Technical University,1999, 14 Pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.

"Corrected Notice of Allowance", U.S. Appl. No. 13/470,633, Apr. 9, 2013, 2 pages.

"Corrected Notice of Allowance", U.S. Appl. No. 13/470,633, Jul. 2, 2013, 2 pages.

"Corrected Notice of Allowance", U.S. Appl. No. 13/651,327, Sep. 12, 2013, 2 pages.

"Corrected Notice of Allowance", U.S. Appl. No. 13/651,327, Sep. 23, 2013, 2 pages.

"Corrected Notice of Allowance", U.S. Appl. No. 13/651,726, Sep. 17, 2013, 2 pages.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.

"Final Office Action", U.S. Appl. No. 13/471,001, Jul. 25, 2013, 20 pages.

"Final Office Action", U.S. Appl. No. 13/471,139, Sep. 16, 2013, 13 pages.

(56) References Cited

OTHER PUBLICATIONS

"Final Office Action", U.S. Appl. No. 13/471,336, Aug. 28, 2013, 18 pages.
"Final Office Action", U.S. Appl. No. 13/651,195, Apr. 18, 2013, 13 pages.
"Final Office Action", U.S. Appl. No. 13/651,232, May 21, 2013, 21 pages.
"Final Office Action", U.S. Appl. No. 13/651,287, May 3, 2013, 16 pages.
"Final Office Action", U.S. Appl. No. 13/651,976, Jul. 25, 2013, 21 pages.
"Final Office Action", U.S. Appl. No. 13/653,321, Aug. 2, 2013, 17 pages.
"Final Office Action", U.S. Appl. No. 13/653,682, Oct. 18, 2013, 16 pages.
"Final Office Action", U.S. Appl. No. 13/656,055, Oct. 23, 2013, 14 pages.
"Final Office Action", U.S. Appl. No. 13/938,930, Nov. 8, 2013, 10 pages.
"Final Office Action", U.S. Appl. No. 13/939,002, Nov. 8, 2013, 7 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"First One Handed Fabric Keyboard with Bluetooth Wireless Technology", Retrieved from: <http://press.xtvworld.com/article3817.html> on May 5, 2012, Jan. 6, 2005, 2 pages.
"Force and Position Sensing Resistors: An Emerging Technology", Interlink Electronics, Available at <http://staff.science.uva.nl/~vlaander/docu/FSR/An_Exploring_Technology.pdf>,Feb. 1990, pp. 1-6.
"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.
"i-Interactor electronic pen", Retrieved from: <http://www.alibaba.com/product-gs/331004878/i_Interactor_electronic_pen.html> on Jun 19, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.
"International Search Report and Written Opinion", Application No. PCT/US2013/028948, Jun. 21, 2013, 11 pages.
"International Search Report and Written Opinion", Application No. PCT/US2013/029461, Jun. 21, 2013, 11 pages.
"International Search Report and Written Opinion", Application No. PCT/US2013/040968, Sep. 5, 2013, 12 pages.
"International Search Report and Written Opinion", Application No. PCT/US2013/042550, Sep. 24, 2013, 14 pages.
"Membrane Keyboards & Membrane Keypads", Retrieved from: <http://www.pannam.com/> on May 9, 2012, Mar. 4, 2009, 2 pages.
"Motion Sensors", Android Developers—retrieved from <http://developer.android.com/guide/topics/sensors/sensors_motion.html> on May 25, 2012, 7 pages.
"MPC Fly Music Production Controller", AKAI Professional, Retrieved from: <http://www.akaiprompc.com/mpc-fly> on Jul. 9, 2012, 4 pages.
"NI Releases New Maschine & Maschine Mikro", Retrieved from <http://www.djbooth.net/index/dj-equipment/entry/ni-releases-new-maschine-mikro/> on Sep. 17, 2012, 19 pages.
"Non-Final Office Action", U.S. Appl. No. 13/471,001, Feb. 19, 2013, 15 pages.
"Non-Final Office Action", U.S. Appl. No. 13/471,139, Mar. 21, 2013, 12 pages.
"Non-Final Office Action", U.S. Appl. No. 13/471,202, Feb. 11, 2013, 10 pages.
"Non-Final Office Action", U.S. Appl. No. 13/471,336, Jan. 18, 2013, 14 pages.
"Non-Final Office Action", U.S. Appl. No. 13/527,263, Jul. 19, 2013, 5 pages.
"Non-Final Office Action", U.S. Appl. No. 13/563,435, Jun. 14, 2013, 6 pages.
"Non-Final Office Action", U.S. Appl. No. 13/564,520, Jun. 19, 2013, 8 pages.
"Non-Final Office Action", U.S. Appl. No. 13/565,124, Jun. 17, 2013, 5 pages.
"Non-Final Office Action", U.S. Appl. No. 13/651,195, Jan. 2, 2013, 14 pages.
"Non-Final Office Action", U.S. Appl. No. 13/651,232, Jan. 17, 2013, 15 pages.
"Non-Final Office Action", U.S. Appl. No. 13/651,232, Dec. 5, 2013, 15 pages.
"Non-Final Office Action", U.S. Appl. No. 13/651,272, Feb. 12, 2013, 10 pages.
"Non-Final Office Action", U.S. Appl. No. 13/651,287, Jan. 29, 2013, 13 pages.
"Non-Final Office Action", U.S. Appl. No. 13/651,304, Mar. 22, 2013, 9 pages.
"Non-Final Office Action", U.S. Appl. No. 13/651,327, Mar. 22, 2013, 6 pages.
"Non-Final Office Action", U.S. Appl. No. 13/651,726, Apr. 15, 2013, 6 pages.
"Non-Final Office Action", U.S. Appl. No. 13/651,871, Mar. 18, 2013, 14 pages.
"Non-Final Office Action", U.S. Appl. No. 13/651,871, Jul. 1, 2013, 5 pages.
"Non-Final Office Action", U.S. Appl. No. 13/651,976, Feb. 22, 2013, 16 pages.
"Non-Final Office Action", U.S. Appl. No. 13/653,321, Feb. 1, 2013, 13 pages.
"Non-Final Office Action", U.S. Appl. No. 13/653,682, Feb. 7, 2013, 11 pages.
"Non-Final Office Action", U.S. Appl. No. 13/653,682, Jun. 3, 2013, 14 pages.
"Non-Final Office Action", U.S. Appl. No. 13/656,055, Apr. 23, 2013, 11 pages.
"Non-Final Office Action", U.S. Appl. No. 13/780,228, Oct. 30, 2013, 12 pages.
"Non-Final Office Action", U.S. Appl. No. 13/938,930, Aug. 29, 2013, 9 pages.
"Non-Final Office Action", U.S. Appl. No. 13/939,002, Aug. 28, 2013, 6 pages.
"Non-Final Office Action", U.S. Appl. No. 13/939,032, Aug. 29, 2013, 7 pages.
"Notice of Allowance", U.S. Appl. No. 13/470,633, Mar. 22, 2013, 7 pages.
"Notice of Allowance", U.S. Appl. No. 13/471,202, May 28, 2013, 7 pages.
"Notice of Allowance", U.S. Appl. No. 13/563,435, Nov. 12, 2013, 5 pages.
"Notice of Allowance", U.S. Appl. No. 13/651,195, Jul. 8, 2013, 9 pages.
"Notice of Allowance", U.S. Appl. No. 13/651,272, May 2, 2013, 7 pages.
"Notice of Allowance", U.S. Appl. No. 13/651,304, Jul. 1, 2013, 5 pages.
"Notice of Allowance", U.S. Appl. No. 13/651,327, Jun. 11, 2013, 7 pages.
"Notice of Allowance", U.S. Appl. No. 13/651,726, May 31, 2013, 5 pages.
"Notice of Allowance", U.S. Appl. No. 13/651,871, Oct. 2, 2013, 7 pages.
"Notice to Grant", CN Application No. 201320097089.9, Sep. 29, 2013, 2 Pages.
"Notice to Grant", CN Application No. 201320097124.7, Oct. 8, 2013, 2 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.

(56) References Cited

OTHER PUBLICATIONS

"Restriction Requirement", U.S. Appl. No. 13/468,918, Nov. 29, 2013, 6 pages.
"Restriction Requirement", U.S. Appl. No. 13/471,139, Jan. 17, 2013, 7 pages.
"Restriction Requirement", U.S. Appl. No. 13/651,304, Jan. 18, 2013, 7 pages.
"Restriction Requirement", U.S. Appl. No. 13/651,726, Feb. 22, 2013, 6 pages.
"Restriction Requirement", U.S. Appl. No. 13/651,871, Feb. 7, 2013, 6 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"SoIRxTM E-Series Multidirectional Phototherapy Expandable™ 2-Bulb Full Body Panel System", Retrieved from: < http://www.solarcsystems.com/us_multidirectional_uv_light_therapy_1_intro.html > on Jul. 25, 2012, 2011, 4 pages.
"Teach Me Simply", Retrieved From: <http://techmesimply.blogspot.in/2013/05/yugatech_3.html> on Nov. 22, 2013, May 3, 2013, pp. 1-6.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"Tilt Shift Lenses: Perspective Control", retrieved from http://www.cambridgeincolour.com/tutorials/tilt-shift-lenses1.htm, Mar. 28, 2008, 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Welcome to Windows 7", Retrieved from: <http://www.microsoft.com/en-us/download/confirmation.aspx?id=4984> on Aug. 1, 2013, Sep. 16, 2009, 3 pages.
"What is Active Alignment?", http://www.kasalis.com/active_alignment.html, retrieved on Nov. 22, 2012, 2 pages.
Block, et al.,' "DeviceOrientation Event Specification", W3C, Editor's Draft, retrieved from <https://developer.palm.com/content/api/dev-guide/pdk/accessing-device-sensors.html> on May 25, 2012,Jul. 12, 2011, 14 pages.
Brown, "Microsoft Shows Off Pressure-Sensitive Keyboard", retrieved from <http://news.cnet.com/8301-17938_105-10304792-1.html> on May 7, 2012, Aug. 6, 2009, 2 pages.
Butler et al.,' "SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012,Oct. 19, 2008, 4 pages.
Chavan, et al.,' "Synthesis, Design and Analysis of a Novel Variable Lift Cam Follower System", In Proceedings: International Journal of Design Engineering, vol. 3, Issue 4, Inderscience Publishers,Jun. 3, 2010, 1 Page.
Crider, "Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Das, et al.,' "Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.
Dietz, et al.,' "A Practical Pressure Sensitive Computer Keyboard", In Proceedings of UIST 2009, Oct. 2009, 4 pages.
Glatt, "Channel and Key Pressure (Aftertouch).", Retrieved from: <http://home.roadrunner.com/~jgglatt/tutr/touch.htm> on Jun. 12, 2012, 2 pages.

Hanlon, "ElekTex Smart Fabric Keyboard Goes Wireless", Retrieved from: <http://www.gizmag.com/go/5048/ > on May 7, 2012, Jan. 15, 2006, 5 pages.
Justin, "SEIDIO Active with Kickstand for the Galaxy SIII", Retrieved From: <http://www.t3chniq.com/seidio-active-with-kickstand-gs3/> on Nov. 22, 2013, Jan. 3, 2013, 5 Pages.
Kaur, "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.
Khuntontong, et al.,' "Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Lahr, "Development of a Novel Cam-based Infinitely Variable Transmission", Proceedings: In Thesis of Master of Science in Mechanical Engineering, Virginia Polytechnic Institute and State University,Nov. 6, 2009, 91 pages.
Lambert, "Cam Design", In Proceedings: Kinematics and dynamics of Machine, University of Waterloo Department of Mechanical Engineering,Jul. 2, 2002, pp. 51-60.
Lee, et al.,' "LED Light Coupler Design for a Ultra Thin Light Guide", Journal of the Optical Society of Korea, vol. 11, Issue.3, Retrieved from <http://opticslab.kongju.ac.kr/pdf/06.pdf>,Sep. 2007, 5 pages.
Linderholm, "Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.
McLellan, "Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.
Post, et al.,' "E-Broidery: Design and Fabrication of Textile-Based Computing", IBM Systems Journal, vol. 39, Issue 3 & 4, Jul. 2000, pp. 840-860.
Prospero, "Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.
Purcher, "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012,Jan. 12, 2012, 15 pages.
Qin, et al.,' "pPen: Enabling Authenticated Pen and Touch Interaction on Tabletop Surfaces", In Proceedings of ITS 2010, Available at <http://www.dfki.de/its2010/papers/pdf/po172.pdf>, Nov. 2010, pp. 283-284.
Sanap, et al.,' "Design and Analysis of Globoidal Cam Index Drive", Proceedings: In International Journal of Scientific Research Engineering & Technology, Jun. 2013, 6 Pages.
Siddiqui, "Hinge Mechanism for Rotatable Component Attachment", U.S. Appl. No. 13/852,848, Mar. 28, 2013, 51 pages.
Sumimoto, "Touch & Write: Surface Computing With Touch and Pen Input", Retrieved from: <http://www.gottabemobile.com/2009/08/07/touch-write-surface-computing-with-touch-and-pen-input/> on Jun. 19, 12, Aug. 7, 2009, 4 pages.
Takamatsu, et al.,' "Flexible Fabric Keyboard with Conductive Polymer-Coated Fibers", In Proceedings of Sensors 2011, Oct. 28, 2011, 4 pages.
Valliath, "Design of Hologram for Brightness Enhancement in Color LCDs", Retrieved from <http://www.loreti.it/Download/PDF/LCD/44_05.PDF> on Sep. 17, 2012, May 1998, 5 pages.
Williams, "A Fourth Generation of LCD Backlight Technology", Retrieved from <http://cds.linear.com/docs/Application%20Note/an65f.pdf>, Nov. 1995, 124 pages.
Zhang, et al.,' "Model-Based Development of Dynamically Adaptive Software", In Proceedings of ICSE 2006, Available at <http://www.irisa.fr/lande/lande/icse-proceedings/icse/p371.pdf>,May 20, 2006, pp. 371-380.

(56) References Cited

OTHER PUBLICATIONS

"Foreign Notice of Allowance", CN Application No. 201320096755.7, Jan. 27, 2014, 2 pages.

"i-Blason Spring Series Premium Flexible KickStand Anti-Slippery TPU Cover Case for iPhone 4 4S (White)", Retrieved From: <http://www.amazon.com/i-Blason-Premium-Flexible-KickStand-Anti-Slippery/dp/B007LCLXLU> Jun. 12, 2014, Nov. 30, 2012, 4 Pages.

"International Search Report and Written Opinion", Application No. PCT/US2014/031531, Jun. 20, 2014, 10 Pages.

"International Search Report and Written Opinion", Application No. PCT/US2013/028769, Jun. 26, 2014, 10 pages.

"Non-Final Office Action", U.S. Appl. No. 13/471,030, May 15, 2014, 10 pages.

"The New Lenovo Yoga Tablet 8", Retrieved From:<http://www.pricepanda.co.in/lenovo-yoga-tablet-8-pid1529091/> Jun. 11, 2014, 2 Pages.

Arar, "HP Envy Rove: A Movable (If Underpowered) All-In-One PC", Retrieved From: <http://www.pcworld.com/article/2047032/hp-envy-rove-a-movable-if-underpowered-all-in-one-pc.html> Jun. 11, 2014, Aug. 21, 2013, 6 Pages.

"Apple Designs a Future Built-In Stand for the iPad & More", Retrieved From: <http://www.patentlyapple.com/patently-apple/2011/02/apple-designs-a-future-built-in-stand-for-the-ipad-more.html> Jun. 11, 2014, Feb. 13, 2011, 9 pages.

Thurrott, "Surface Pro 3: Continuous Kickstand", Retrieved From: <http://winsupersite.com/mobile-devices/surface-pro-3-continuous-kickstand> Jun. 11, 2014, May 21, 2014, 5 Pages.

"Corrected Notice of Allowance", U.S. Appl. No. 13/471,030, Aug. 10, 2015, 2 pages.

"Corrected Notice of Allowance", U.S. Appl. No. 13/656,055, Apr. 13, 2015, 2 pages.

"Corrected Notice of Allowance", U.S. Appl. No. 13/656,055, Jul. 1, 2015, 2 pages.

"Final Office Action", U.S. Appl. No. 13/656,055, Sep. 17, 2014, 10 pages.

"Final Office Action", U.S. Appl. No. 13/852,848, Jul. 20, 2015, 9 pages.

"International Preliminary Report on Patentability", U.S. Appl. No. PCT/US2014/031531, Jun. 9, 2015, 7 pages.

"Non-Final Office Action", U.S. Appl. No. 13/656,055, Mar. 12, 2014, 17 pages.

"Notice of Allowance", U.S. Appl. No. 13/656,055, Mar. 4, 2015, 7 pages.

"Supplemental Notice of Allowance", U.S. Appl. No. 13/656,055, May 15, 2015, 2 pages.

"Supplemental Notice of Allowance", U.S. Appl. No. 13/656,055, Jun. 10, 2015, 2 pages.

"Non-Final Office Action", U.S. Appl. No. 13/780,228, Sep. 18, 2015, 19 pages.

"International Search Report and Written Opinion", Application No. PCT/US2015/052757, Dec. 4, 2015, 12 pages.

"Corrected Notice of Allowance", U.S. Appl. No. 13/852,848, Jan. 29, 2016, 2 pages.

"Notice of Allowance", U.S. Appl. No. 13/852,848, Nov. 19, 2015, 4 pages.

"Restriction Requirement", U.S. Appl. No. 14/502,867, Feb. 16, 2016, 7 pages.

"Foreign Office Action", CN Application No. 201310067356.2, Feb. 4, 2016, 15 Pages.

"Corrected Notice of Allowance", U.S. Appl. No. 13/852,848, Mar. 2, 2016, 2 pages.

\* cited by examiner

HINGE MECHANISM WITH PRESET POSITIONS

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, the devices are typically designed to be used in a handheld manner. Traditional ways of adapting mobile devices for other uses (e.g., on a table or other surface) tend to be awkward and detract from the mobile aesthetic associated with mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A hinge mechanism with preset positions is described. In at least some implementations, the hinge mechanism enables a support component to be adjustably attached to an apparatus, such as a computing device. The support component can be rotated via the hinge mechanism to various positions to provide support for different orientations of the computing device. In at least some embodiments, a hinge mechanism utilizes preset hinge positions that enable a support component to be placed at different preset positions. For instance, the hinge mechanism is configured such that an attached support component tends to "snap" into various preset positions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
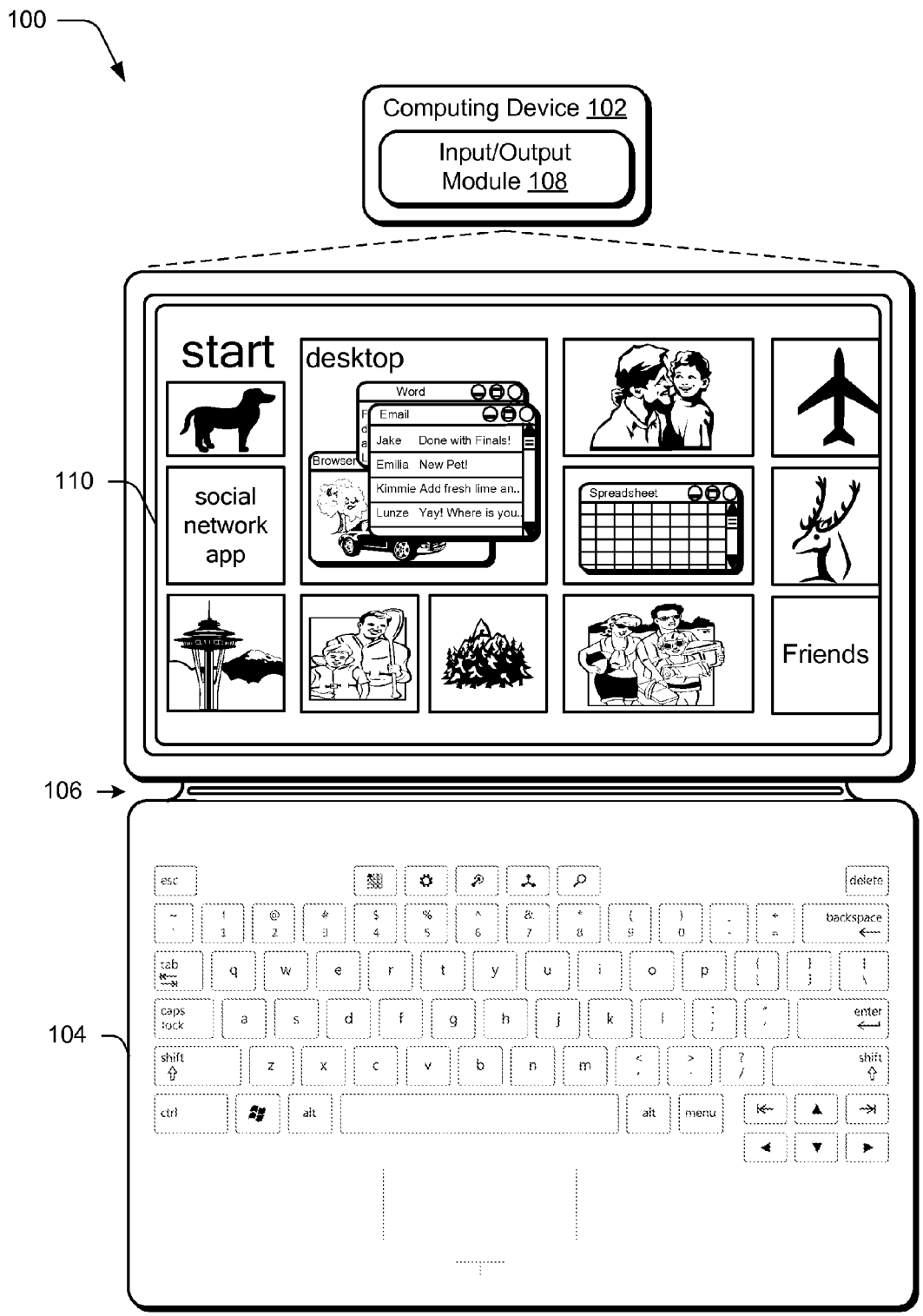
FIG. 1 is an illustration of an environment in an example implementation that is operable to employ the techniques described herein in accordance with one or more embodiments.

A hinge mechanism with preset positions is described. In at least some implementations, the hinge mechanism enables a support component to be adjustably attached to an apparatus, such as a computing device. For example, the hinge mechanism can be employed to rotatably attach a kickstand to a mobile computing device. The kickstand can be rotated via the hinge mechanism to various positions to provide support for different orientations of the computing device. For example, the kickstand can be positioned to support the computing device in a typing orientation such that input can be provided via an associated input device. As another example, the kickstand can be positioned to enable viewing and/or interaction with the computing device, such as in a portrait viewing orientation.

In at least some embodiments, a hinge mechanism utilizes preset hinge positions that enable a kickstand to be placed at different preset positions. Further, the hinge mechanism includes a center of rotation that is external to the hinge mechanism. Thus, the kickstand can conform to a contour of the computing device when in a closed position, and maintain a minimal external profile when moving between the different preset positions.

According to various embodiments, the hinge mechanism discussed herein is configured such that an attached support component tends to "snap" into various preset positions. Generally, snapping refers to movement of the hinge mechanism in response to force generated internally to the hinge mechanism, e.g., via a hinge spring. In at least some embodiments, snapping occurs when a user releases a support component, e.g., independent of user-applied force to the support component. For instance, torque forces that apply during movement of the hinge mechanism are such that the hinge mechanism typically does not rest at positions outside of the preset positions unless held there by a user. Thus, torque forces at work during movement of an attached support component provide a form of tactile feedback that indicates to a user whether the support component is positioned in a normal operating position, e.g., at a preset position for the hinge mechanism. Various attributes and components of example hinge mechanisms are presented in detail below.

In the following discussion, an example environment is first described that may employ the techniques described herein. Embodiments discussed herein are not limited to the example environment, and the example environment is not limited to embodiments discussed herein. Next, example device orientations are discussed in accordance with one or more embodiments. Following this, an example kickstand is described in accordance with one or more embodiments. Next, example hinges for kickstand attachment are discussed in accordance with one or more embodiments. Following this, a section entitled "Hinge Responsiveness Profile" discusses an example torque profile for hinge movement in accordance with one or more embodiments. Finally, an example system and device are discussed that may implement various techniques described herein.

Example Environment

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on.

While embodiments presented herein are discussed in the context of a tablet device, it is to be appreciated that various other types and form factors of devices may be utilized in accordance with the claimed embodiments. Thus, the computing device 102 may range from full resource devices with substantial memory and processor resources, to a low-resource device with limited memory and/or processing resources. An example implementation of the computing device 102 is discussed below with reference to FIG. 23.

The computing device 102 is illustrated as including an input/output module 108, which is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

Example Device Orientations

Figure 2:
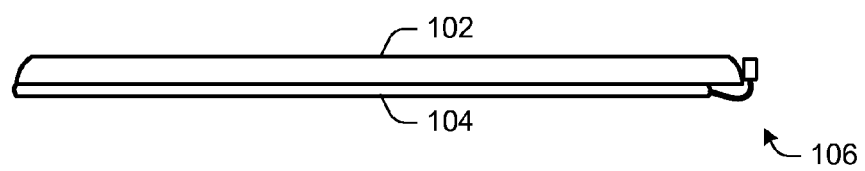
FIG. 2 depicts an example orientation of the input device in relation to the computing device as covering a display device of the computing device in accordance with one or more embodiments.

According to various embodiments, a variety of different orientations of the computing device 102 are supported. For example, rotational movement may be supported by the flexible hinge 106 such that the input device 104 may be placed against the display device 110 of the computing device 102 and thereby act as a cover as shown in the example orientation 200 of FIG. 2. Thus, the input device 104 may act to protect the display device 110 of the computing device 102 from harm.

Figure 3:
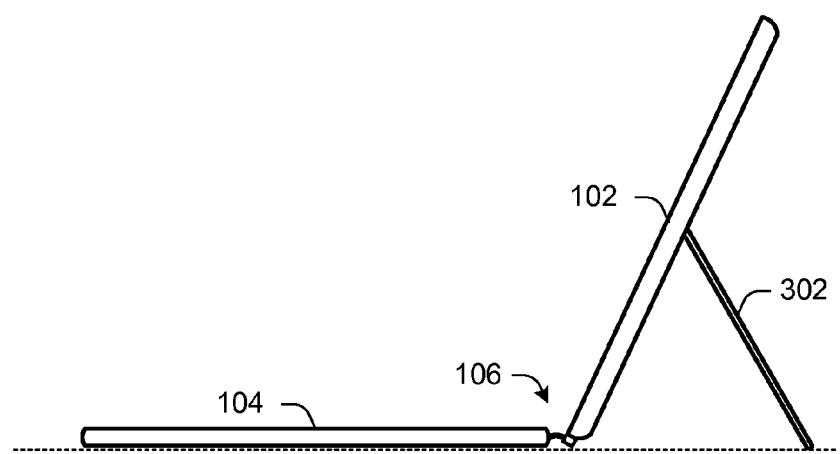
FIG. 3 depicts an example orientation of the input device in relation to the computing device as assuming a typing orientation in accordance with one or more embodiments.

As shown in the example orientation 300 of FIG. 3, a typing arrangement may be supported. In this orientation, the input device 104 is laid flat against a surface and the computing device 102 is disposed at an angle to permit viewing of the display device 110, e.g., such as through use of a kickstand 302 disposed on a rear surface of the computing device 102.

Naturally, a variety of other orientations other than those expressly illustrated and discussed herein are also supported.

Kickstand

The described kickstand can be employed as a support component to enable a variety of different orientations for the computing device 102. For instance, consider the following implementations of a kickstand in accordance with various embodiments.

Figure 4:
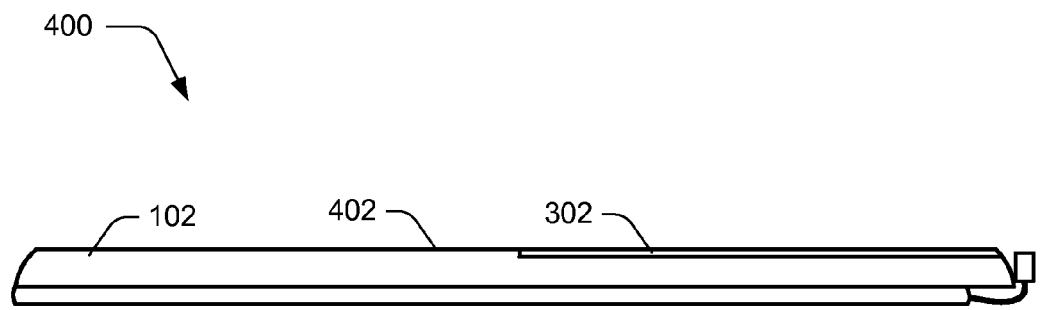
FIG. 4 depicts an example orientation of a computing device with a kickstand in accordance with one or more embodiments.

FIG. 4 illustrates an orientation 400, and includes the kickstand 302 in a closed position. In the closed position, the kickstand 302 forms a portion of a rear surface 402 of the computing device 102 such that the kickstand 302 conforms to a surface contour of the computing device 102. For instance, when the kickstand 302 is in the closed position, the kickstand 302 integrates into the computing device 102 and does not protrude from a plane formed by the rear surface 402.

Figure 5:
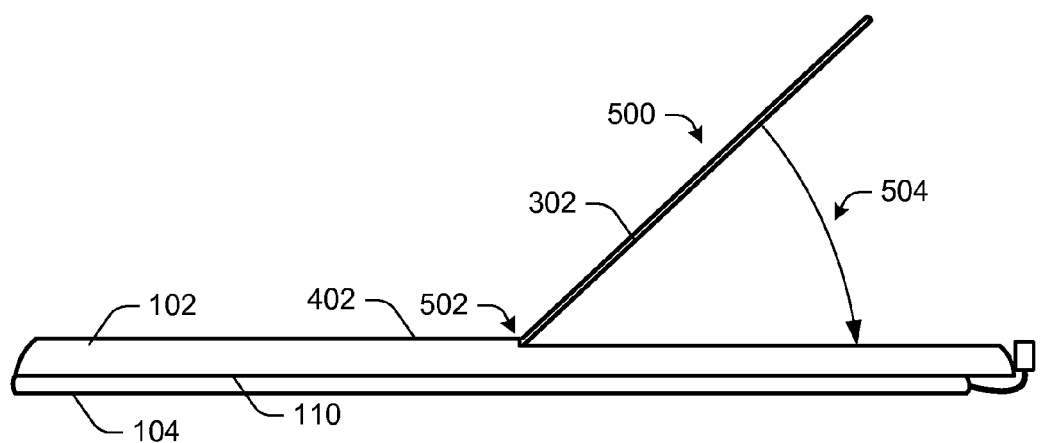
FIG. 5 depicts an example orientation of a computing device with a kickstand in accordance with one or more embodiments.

FIG. 5 illustrates that the kickstand 302 can be rotated away from the rear surface 402 of the computing device 102 to a position 500. For instance, the kickstand 302 can be rotatably attached to the computing device 102 along a seam 502 via a hinge mechanism. Examples of such a hinge mechanism are detailed below.

In at least some implementations, the position 500 corresponds to a preset position for the kickstand 302. For instance, when a user applies pressure to the kickstand 302 away from the rear surface 402, the kickstand 302 can snap into the position 500. As detailed below, a hinge mechanism employed to attach the kickstand 302 to the computing device 102 can utilize spring pressure and detent settings to provide preset open positions for the kickstand 302. In this example, the position 500 is associated with an angle 504 between the rear surface of the computing device 102 and the kickstand 302. For instance, the angle 504 can range from 45 degrees (45°) to 55 degrees (55°). The angle 504, for example, is approximately 50°, +/−5°. Any suitable angle and/or range of angles may be employed, however.

With the kickstand 302 in the position 500, the computing device 102 can be rotated away from the input device 104 and supported by the kickstand 302, such as illustrated in the orientation 300 of FIG. 3. Thus, the position 500 can enable the display device 110 to be viewed, and input to be provided to the computing device 102 via the input device 104. Alternatively or additionally, the position 500 enables a user to interact with a touchscreen of the computing device 102.

Figure 6:
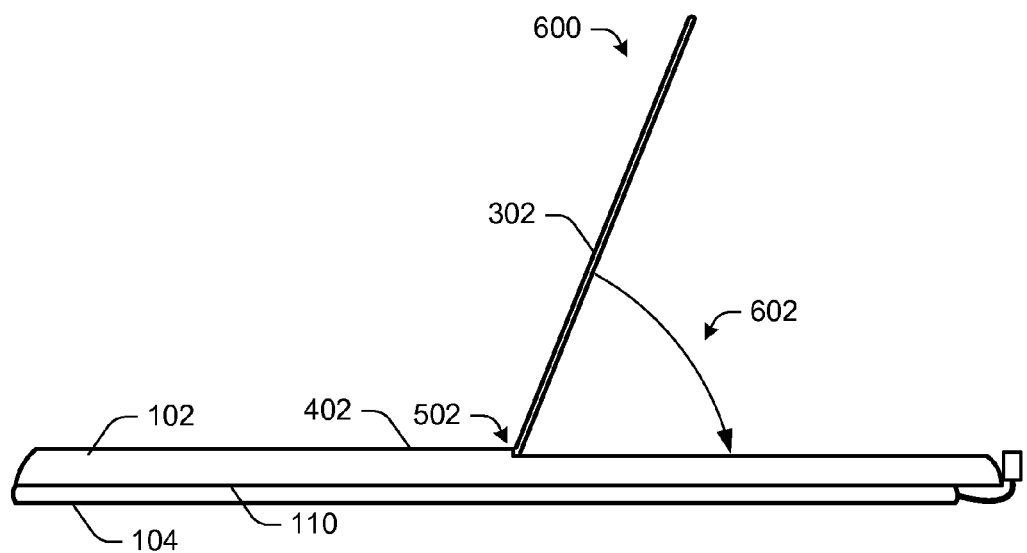
FIG. 6 depicts an example orientation of a computing device with a kickstand in accordance with one or more embodiments.

FIG. 6 illustrates that the kickstand 302 can be rotated away from the rear surface 402 of the computing device 102 to a position 600. For instance, the kickstand 302 can be rotated further past the position 500 to the position 600.

In at least some implementations, the position 600 corresponds to a further preset position for the kickstand 302. For example, when a user applies pressure to the kickstand 302 away from the rear surface 402 (e.g., past the position 500), the kickstand 302 can snap into the position 600. In this example, the position 600 is associated with an angle 602 between the rear surface of the computing device 102 and the kickstand 302. For instance, the angle 602 can range from 75 degrees (75°) to 85 degrees (85°). The angle 602, for example, is approximately 80°, +/−5°. Any suitable angle and/or range of angles may be employed, however. Further, the seam 502 can be maintained (e.g., the width of the seam) during rotation to the position 600.

With the kickstand 302 in the position 600, the computing device 102 supports a variety of different usage scenarios. For instance, consider the following two example scenarios.

Figure 7A:
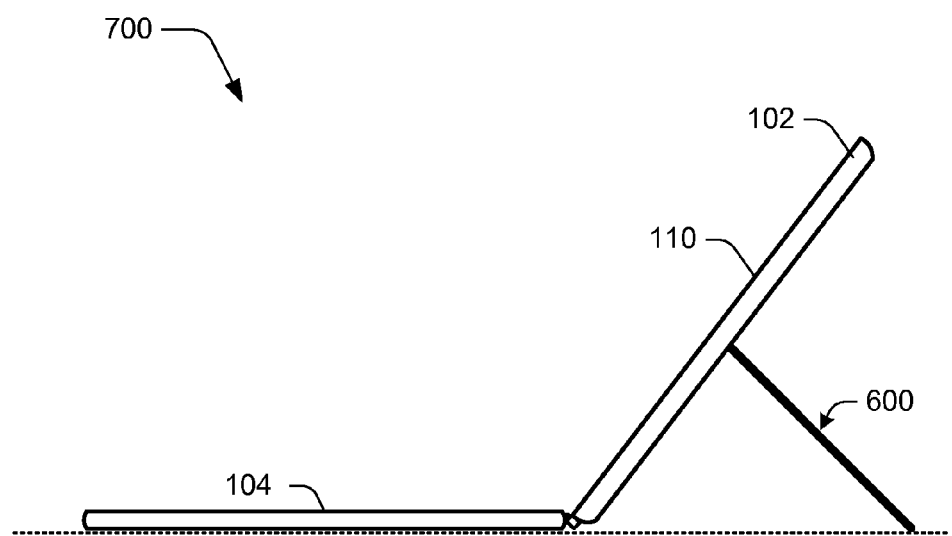
FIG. 7a depicts an example orientation of a computing device with a kickstand in accordance with one or more embodiments.

FIG. 7a illustrates a side view of the computing device 102 in an orientation 700 and with the kickstand 302 positioned in the position 600. In the position 700, the computing device is reclined in comparison to previously-discussed orientations, such as the orientation 300 discussed above with reference to FIG. 3. As illustrated, the orientation 700 presents the display device 110 at a more open angle that supports different usage scenarios. For instance, the orientation 700 supports use of the computing device 102 in a user's lap, such as during air travel. A variety of other usage scenarios are supported by the orientation 700, such as for tall users that may have a higher viewing angle, use on a low surface (e.g., a coffee table), and so forth.

With the kickstand 302 in the position 600, the computing device 102 can also be rotated sideways (e.g., to a portrait viewing position) and supported via the kickstand 302. For instance, consider an orientation 702 illustrated in FIG. 7b.

Figure 7B:
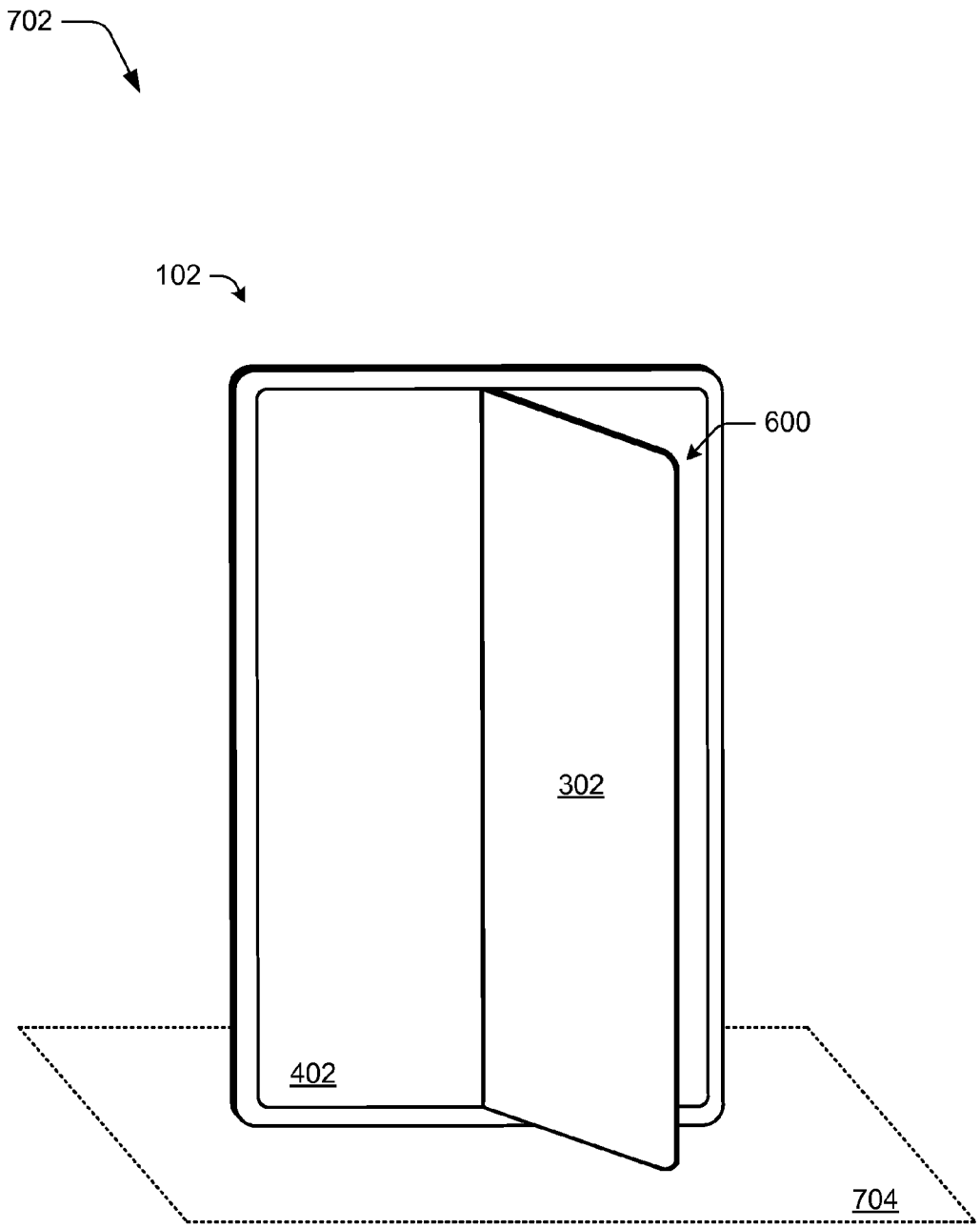
FIG. 7b depicts a rear view of an example orientation of a computing device with a kickstand in accordance with one or more embodiments.

FIG. 7b illustrates a rear view of the computing device 102 in the orientation 702, showing that the computing device 102 is rotated to a portrait viewing position, such as 90 degrees (90°) to the orientation illustrated in FIG. 1. Further, the kickstand 302 is positioned in the position 600 such that the computing device 102 reclines back and is supported by the kickstand 302 on a surface 704. Although not illustrated here, placing the computing device 102 in the orientation 702 can cause a view orientation of the display device 110 to be rotated to a portrait view.

In FIG. 7b, the computing device 102 is illustrated without the input device 104. Thus, in at least some embodiments the input device 104 can be separated from the computing device 102 such that the computing device 102 has functionality independent of the input device 104. For example, the flexible hinge 106 can employ a magnetic attachment mechanism that holds the input device 104 to the computing device 102 via magnetic force. Thus, a user can grasp the computing device 102 and the input device 104, and can pull the two apart by overcoming the magnetic attraction between them.

When separate from the input device 104, the computing device 102 can provide various functionality. For example, a user can view content via the computing device 102, such as movies and/or streaming content. Further, a user can interact with touch screen functionality of the display device 110.

Thus, placing the kickstand 302 in the position 600 can enable a user to place the computing device in a landscape and/or portrait orientation, and to view and/or interact with the computing device in such orientations.

Figure 8:
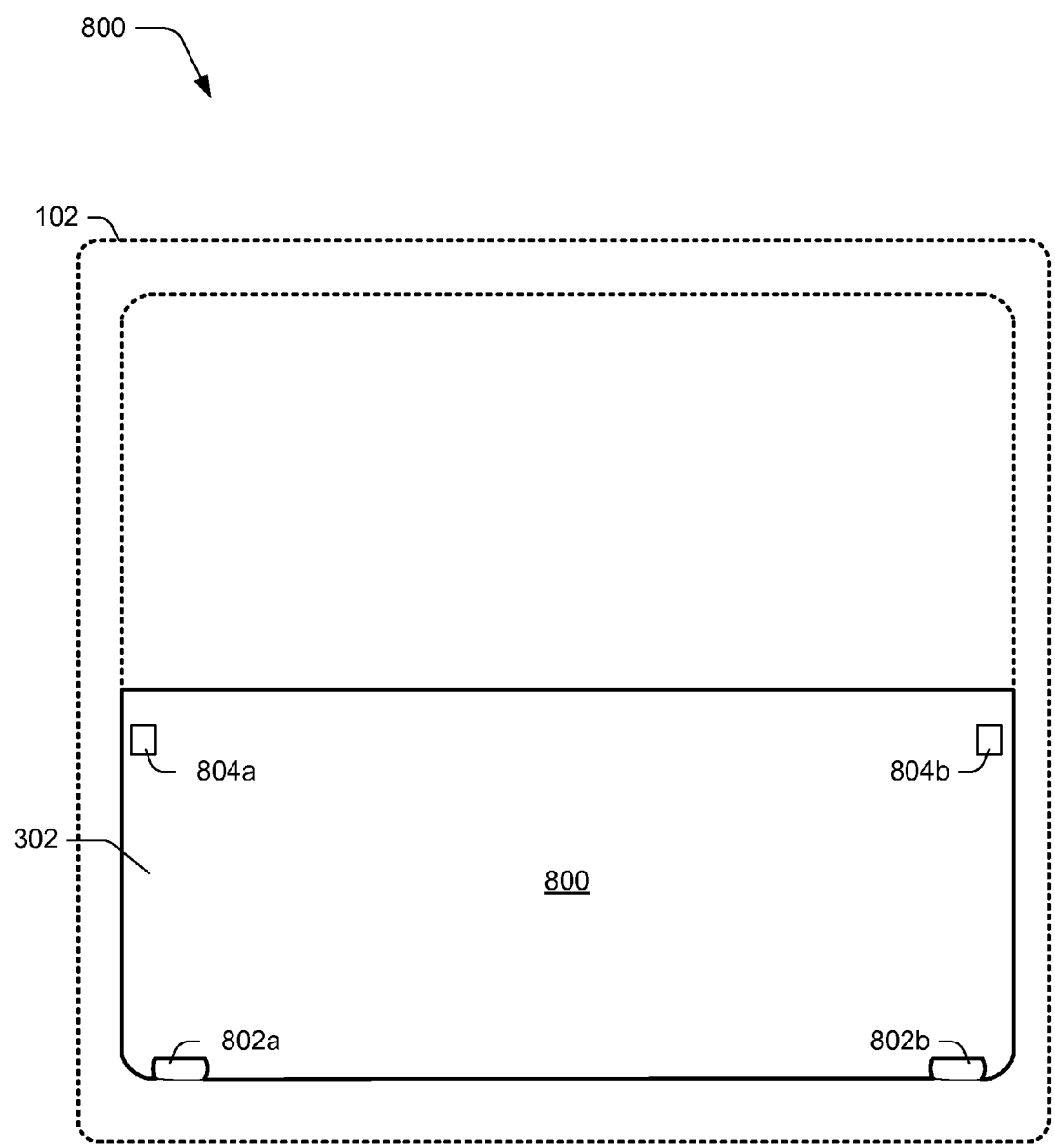
FIG. 8 depicts an example inner surface of a kickstand in accordance with one or more embodiments.

FIG. 8 illustrates a view of an inner surface 800 of the kickstand 302 in accordance with one or more embodiments. In this example, the kickstand 302 is illustrated in the context of an outline of a chassis of the computing device 102.

The inner surface 800 includes surface contacts 802a and 802b, which function as surface contact points when the kickstand 302 is in an open position. The surface contacts 802a, 802b can be formed using a variety of types of skid-resistant materials, and can be positioned within a notch in the inner surface 800. For example, the surface contacts 802a, 802b can be formed from an elastic material and can be substantially dovetail shaped such that the surface contacts can be held within a notch in the inner surface 800 via elastic pressure. Additionally or alternatively, the surface contacts 802a, 802b can be affixed to the inner surface 800 via a suitable adhesive.

The surface contacts 802a, 802b are positioned on a bottom edge of the kickstand 302 such that when the kickstand 302 is open and resting on a surface, the surface contacts 802a, 802b serve as insulators between the kickstand 302 and the surface. For example, the surface contacts 802a, 802b can reduce the transmission of vibrations between the kickstand 302 and an adjacent surface. Further, the surface contacts 802a, 802b can reduce slippage of the kickstand 302 on a surface. For instance, the surface contacts 802a, 802b can be formed from a rubberized material that resists slippage on a variety of different surfaces. Thus, when the computing device 102 is supported by the kickstand 302 (e.g., in the orientation 300 discussed above), the surface contacts 802a, 802b can assist in stabilizing the computing device 102 and reduce noise that can be caused by vibration of the kickstand 302 on a surface.

The inner surface 800 further includes hinge mounts 804a, 804b, which function as mounting points for hinge mechanisms that are employed to attach the kickstand 302 to the computing device 102. Examples of such hinge mechanisms are discussed below.

Hinges for Component Attachment

A variety of different hinge mechanisms can be employed for attaching various components in accordance with various embodiments. Some example hinge mechanisms and hinge arrangements are discussed below.

Figure 9:
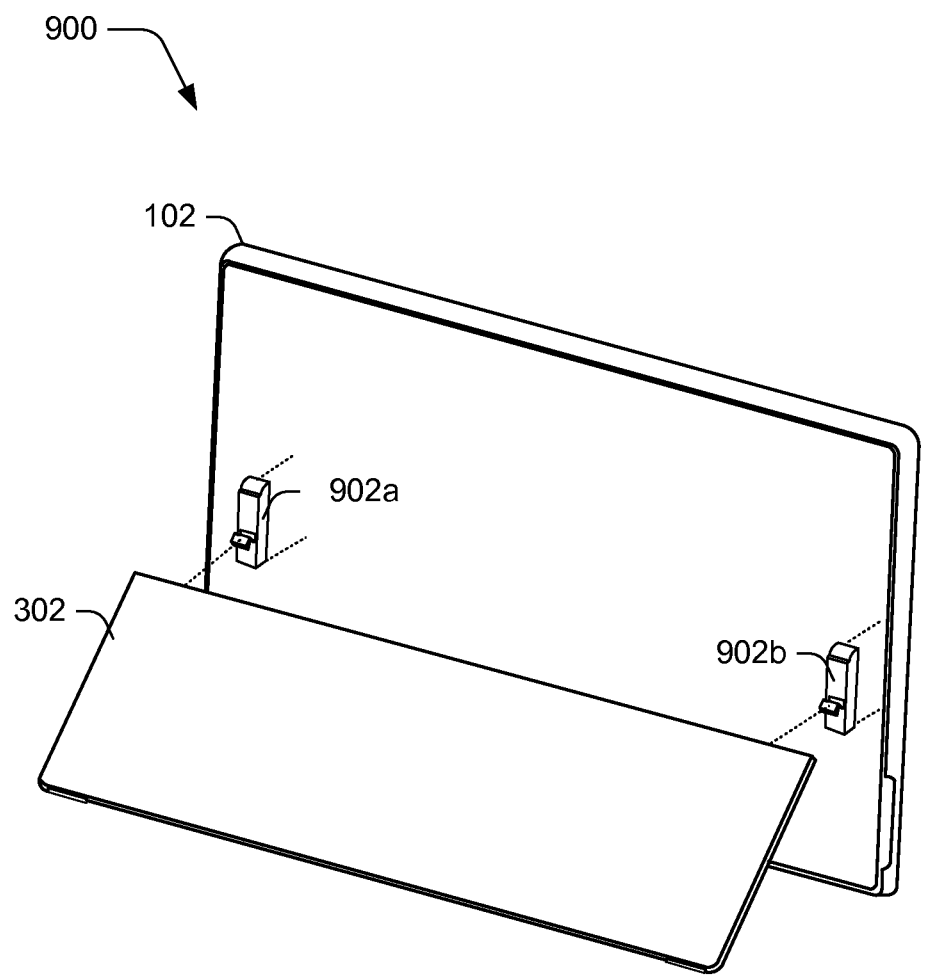
FIG. 9 depicts an example exploded view of a computing device with a kickstand in accordance with one or more embodiments.

FIG. 9 illustrates an exploded rear view 900 of a chassis of the computing device 102 and the kickstand 302. Included in the rear view 900 are hinges 902a and 902b, which are employed to attach the kickstand 302 to the computing device 102. The hinges 902a, 902b are configured to be installed internally in the computing device 102, such as via a suitable attachment method and/or device.

The kickstand 302 can be attached to a pivoting portion of the hinges 902a, 902b via the hinge mounts 804a, 804b, discussed above with reference to FIG. 8. Thus, attachment to the hinges 902a, 902b enables the kickstand 302 to pivot between various positions with reference to the computing device 102.

Figure 10:
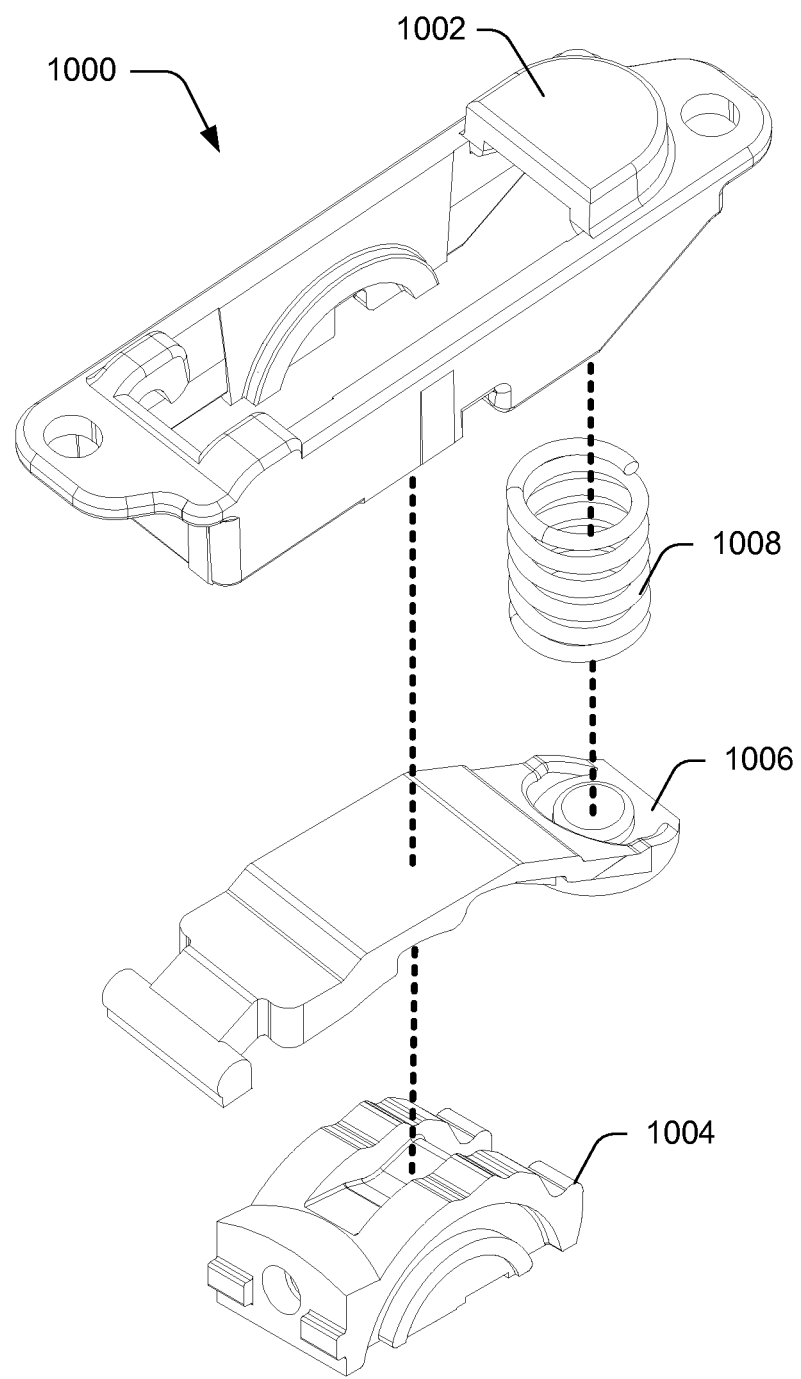
FIG. 10 illustrates components of an example hinge mechanism in accordance with one or more embodiments.

FIG. 10 illustrates components of an example hinge 1000 in accordance with one or more embodiments. The hinge 1000, for instance, can represent an implementation of the hinges 902a, 902b discussed above. This is not intended to be limiting, however, and the hinge 1000 can be employed as a hinge mechanism for a variety of different components and in a variety of different attachment scenarios. The hinge 1000 and its various components can be formed using any suitable material and/or combination of materials, such as metals, plastics, polymers, alloys, and so forth.

Components of the hinge 1000 include a hinge frame 1002 in which various other components of the hinge 1000 can be disposed. For example, the hinge frame 1002 can be mounted to a device (e.g., the computing device 102) and function as a support structure for other components of the hinge 1000.

Further included are a cam 1004 and a cam follower 1006. As detailed elsewhere herein, interaction between the cam 1004 and the cam follower 1006 within the hinge 1000 provides a particular responsiveness profile during user manipulation of a component attached to the hinge 1000, e.g., the kickstand 302.

The hinge 1000 also includes a hinge spring 1008, which applies pressure to the cam follower 1006 when the various components are placed in their respective positions within the hinge frame 1002. Further details concerning components and functionality of the hinge 1000 are now discussed.

Figure 11:
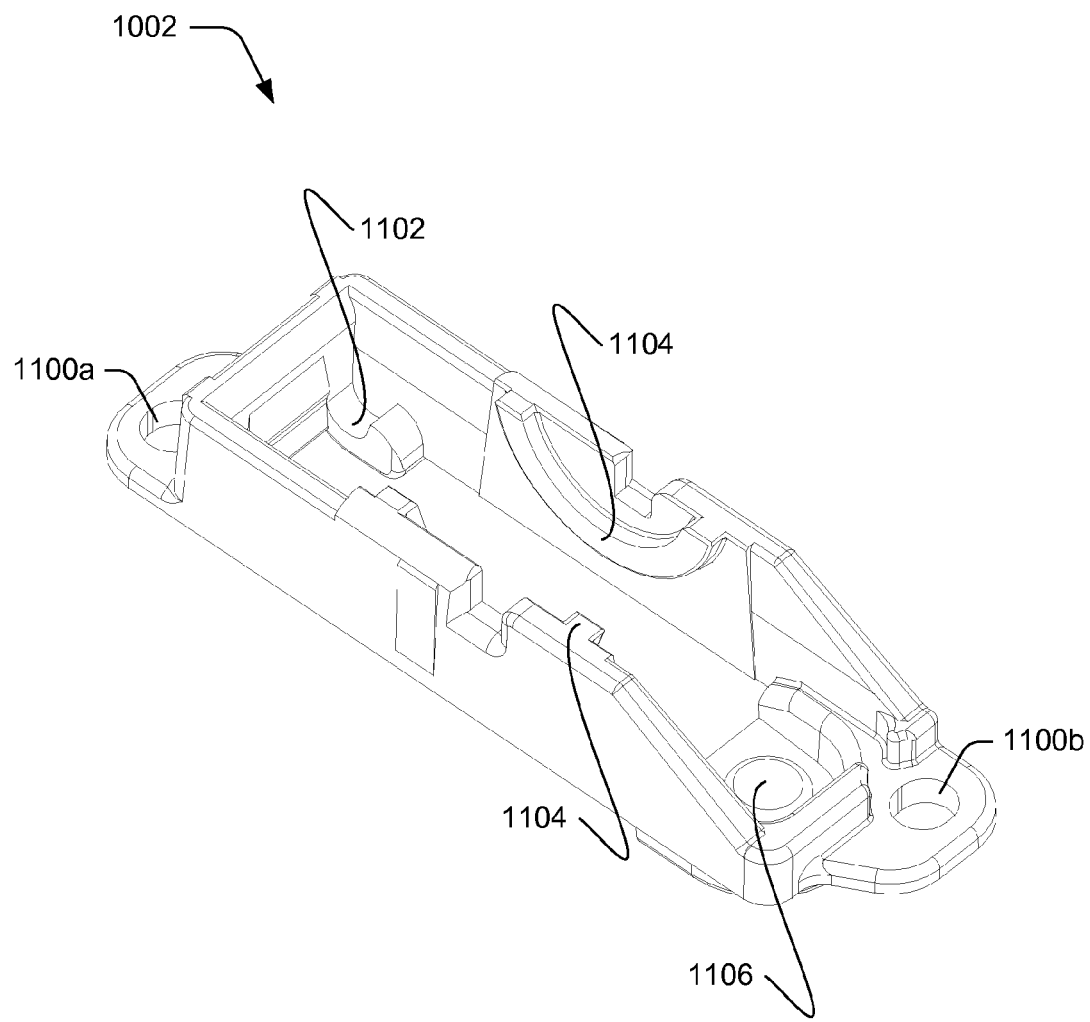
FIG. 11 illustrates a detail of portions of a hinge frame in accordance with one or more embodiments.

FIG. 11 illustrates a detail of portions of the hinge frame 1002. The hinge frame 1002 includes hinge mounts 1100a and 1100b by which the hinge frame 1002, and thus the hinge 1000, can be mounted to an apparatus. For instance, a fastening mechanism such as a screw or a bolt can be positioned through the hinge mounts 1100a, 1100b and fastened into an apparatus, such as the computing device 102.

The hinge frame 1002 further includes a cam follower mount 1102 into which the cam follower 1006 can be mounted. While not expressly illustrated here, the cam follower mount 1102 includes a similar portion on the opposite inside surface of the hinge frame 1002, thus forming a cradle into which a mounting portion of the cam follower 1006 can be attached.

A cam guide 1104 represents raised portions on the inside surface of the hinge frame 1002 which are employed for mounting the cam 1004 into the hinge frame 1002. For instance, the cam guide 1104 includes the illustrated portion as well as another portion mirrored on the opposite inside surface of the hinge frame 1002. Generally, the cam 1004 engages with the cam guide 1104 to hold the cam 1004 within the hinge frame 1002. During movement of a component attached to the cam 1004, the cam guide 1104 causes rotational movement of the cam 1004. As further illustrated herein, rotational movement of the cam 1004 enables an attached component to be positioned in various different positions.

The hinge frame 1002 further includes a spring mount 1106, which represents a surface onto which the hinge spring 1008 is placed. As further detailed elsewhere herein, placement of the hinge spring 1008 onto the spring mount 1106 enables the hinge spring 1008 to exert pressure upon the cam follower 1006. Spring pressure on the cam follower 1006 holds the cam follower against the cam 1004 and thus enables the cam 1004 to be held in various preset positions.

Figure 12:
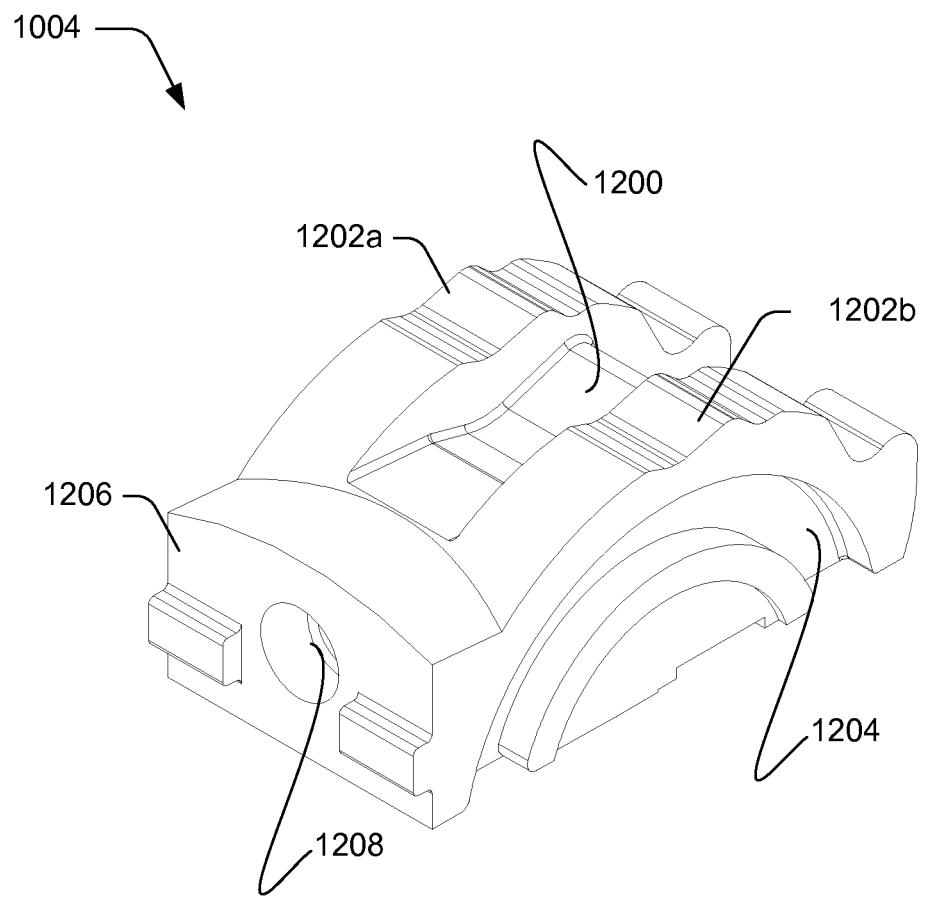
FIG. 12 illustrates a detail of portions of a hinge cam in accordance with one or more embodiments.

FIG. 12 illustrates a detail of portions of the cam 1004. The cam 1004 includes an inner cam surface 1200 and outer cam surfaces 1202a, 1202b. As illustrated, the inner cam surface 1200 is recessed in a channel along an inside portion of the cam 1004. The inner cam surface 1200, for instance, can be positioned along center lengthwise axis of the cam 1004.

The outer cam surfaces 1202a, 1202b are positioned on either side of the inner cam surface 1200 and are raised above the inner cam surface 1200. As further detailed below, the inner cam surface 1200 and the outer cam surfaces 1202a, 1202b have particular surface profiles that interact with the cam follower 1006 to provide a particular response profile during movement of an attached component.

The cam 1004 further includes a guide channel 1204 and a component mounting surface 1206. The guide channel 1204 is formed such that when the cam 1004 is mounted within the hinge frame 1002, the guide channel 1204 engages with the cam guide 1104. The dimensions of the cam guide 1104, for instance, are such that the cam guide 1104 fits within the guide channel 1204. During movement of the cam 1004 relative to the hinge frame 1002, the guide channel 1204 slides relative to the cam guide 1104 to enable rotational movement of the cam 1004 relative to the hinge frame 1002.

The component mounting surface 1206 is representative of a portion of the cam 1004 to which a component (e.g., the kickstand 302) can be mounted. For instance, the component mounting surface 1206 includes surface attributes that engage and/or interlock with a component to stabilize the component relative to the cam 1004. The component mounting surface 1206 includes a mounting hole 1208. The mounting hole 1208, for instance, is threaded on its interior surface. Thus, a screw or other attachment mechanism can be threaded into the mounting hole 1208 to attach a component to the component mounting surface 1206.

Figure 13:
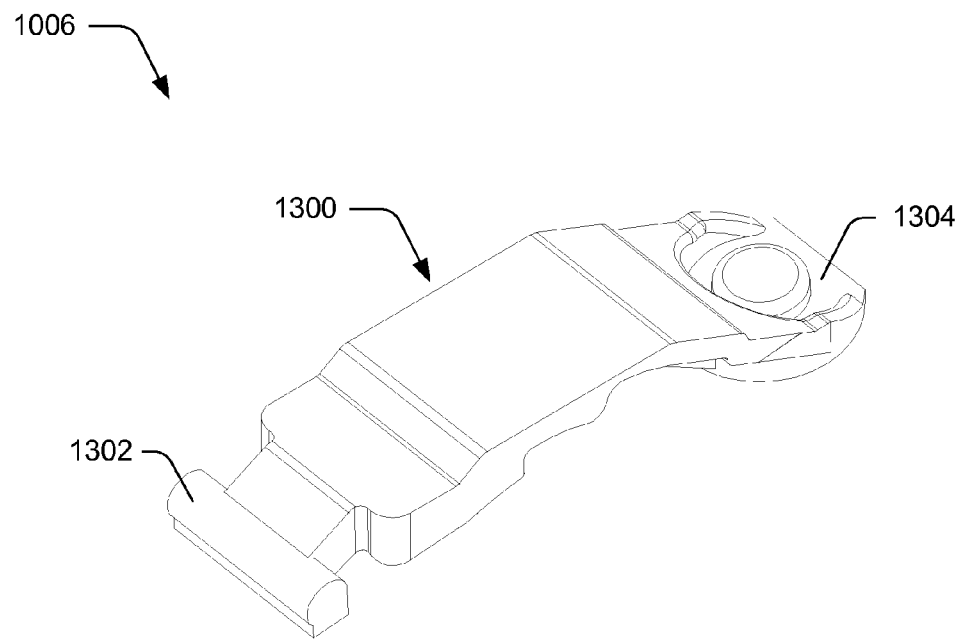
FIG. 13 illustrates a detail of a top surface of a cam follower in accordance with one or more embodiments.

FIG. 13 illustrates a detail of a top surface 1300 of the cam follower 1006. The top surface 1300 includes a follower pivot 1302 which is formed to engage within the cam follower mount 1102 (introduced above) of the hinge frame 1002. For instance, the follower pivot 1302 is fashioned such that the follower pivot slidably rotates within the cam follower mount 1102.

The top surface 1300 of the cam follower 1006 further includes a spring platform 1304 in which the hinge spring 1008 is engaged. For example, spring tension from the hinge spring 1008 against the spring platform 1304 holds the cam follower 1006 against the cam 1004. Thus, spring force against the cam follower 1006 results in a reaction at the cam 1004 that provides a torque response at the cam 1004. As discussed herein, the torque response results at least in part from the shape of the cam 1004 and the cam follower 1006, and the interaction between their respective surfaces.

For instance, depending on the angular position of the cam 1004 and the direction of motion, movement of the cam 1004 may be either resisted (e.g., opposed) or driven. If the kickstand 302 is released between 30 degrees and 50 degrees, for example, force from the hinge spring 1008 creates a reaction between the cam follower 1006 and the cam 1004 that actively drives the cam 1004 to the 50 degree open position, e.g., the position 500 discussed above with reference to FIG. 5. This interaction between the different elements of the hinge 1000 provides for a "snappy" response of an attached component, e.g., the kickstand 302.

Figure 14:
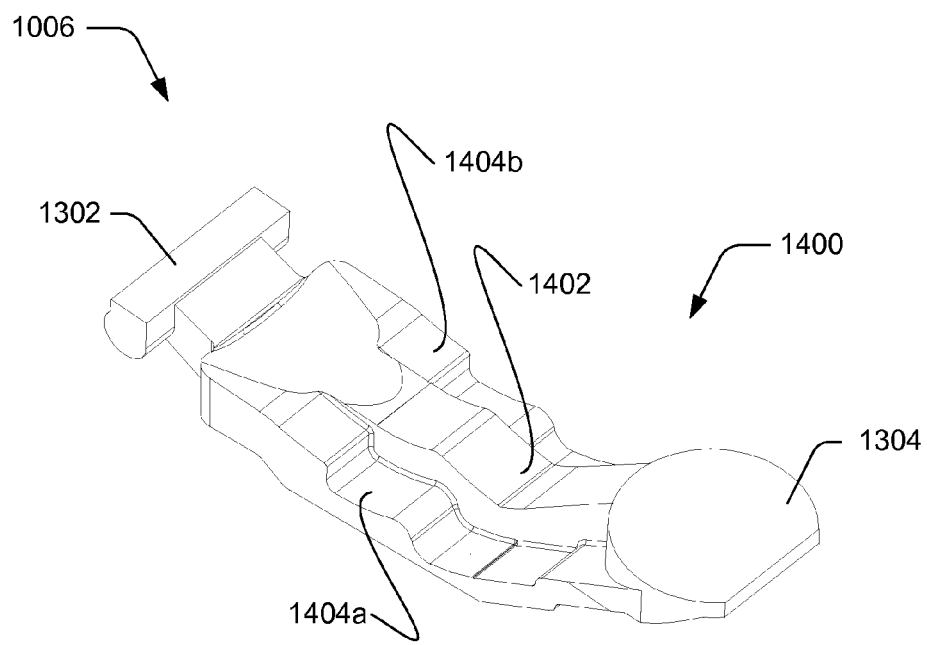
FIG. 14 illustrates a detail of a bottom surface of a cam follower in accordance with one or more embodiments.

FIG. 14 illustrates a detail of a bottom surface 1400 of the cam follower 1006. The bottom surface 1400 includes lower portions of the follower pivot 1302 and the spring platform 1304, introduced above.

The bottom surface 1400 further includes an inner follower surface 1402 and outer follower surfaces 1404*a*, 1404*b*. The inner follower surface 1402 is raised on the bottom surface 1400 relative to the outer follower surfaces 1404*a*, 1404*b*. As detailed elsewhere herein, the inner follower surface 1402 and the outer follower surfaces 1404*a*, 1404*b* interact with surfaces of the cam 1004 to according to various techniques discussed herein.

Figure 15:
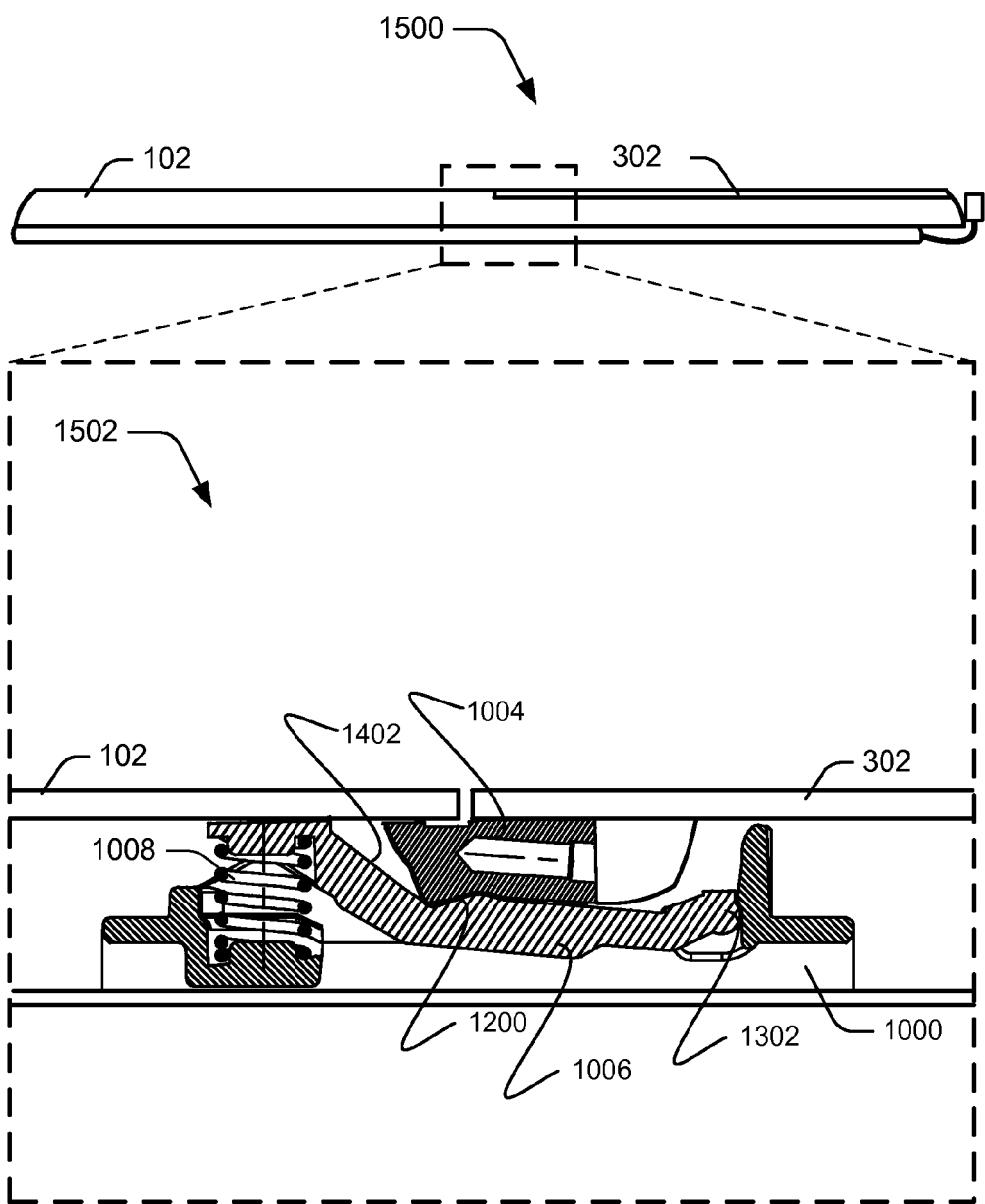
FIG. 15 illustrates a computing device with a kickstand in a closed position in accordance with one or more embodiments.

FIG. 15 illustrates the computing device 102 with the kickstand 302 in a position 1500. In at least some embodiments, the position 1500 corresponds to a closed position for the kickstand 302, such as discussed above with reference to FIG. 4. Further illustrated is a partial side section view 1502 of the computing device 102, including the kickstand 302 attached to the cam 1004 of the hinge 1000 in a closed position.

In the section view 1502, the cam 1004 is sectioned lengthwise down the center, and thus the illustrated section of the cam 1004 illustrates a surface profile of the inner cam surface 1200, introduced above. The cam follower 1006 is also sectioned lengthwise down the center, and thus the illustrated section of the cam follower 1006 illustrates a surface profile of the inner follower surface 1402.

In the position 1500, force applied by the hinge spring 1008 holds the cam follower 1006 against the cam 1004. Further, the profile of the cam follower 1006 and the cam 1004 are such that movement of the kickstand 302 is resisted. For instance, the hinge spring 1008 resists rotational movement of the cam follower 1004 on the follower pivot 1302. Thus, absent force applied by a user to the kickstand 302, pressure from the cam follower 1006 against the cam 1004 holds the kickstand 302 in a closed position against the computing device 102.

Figure 16:
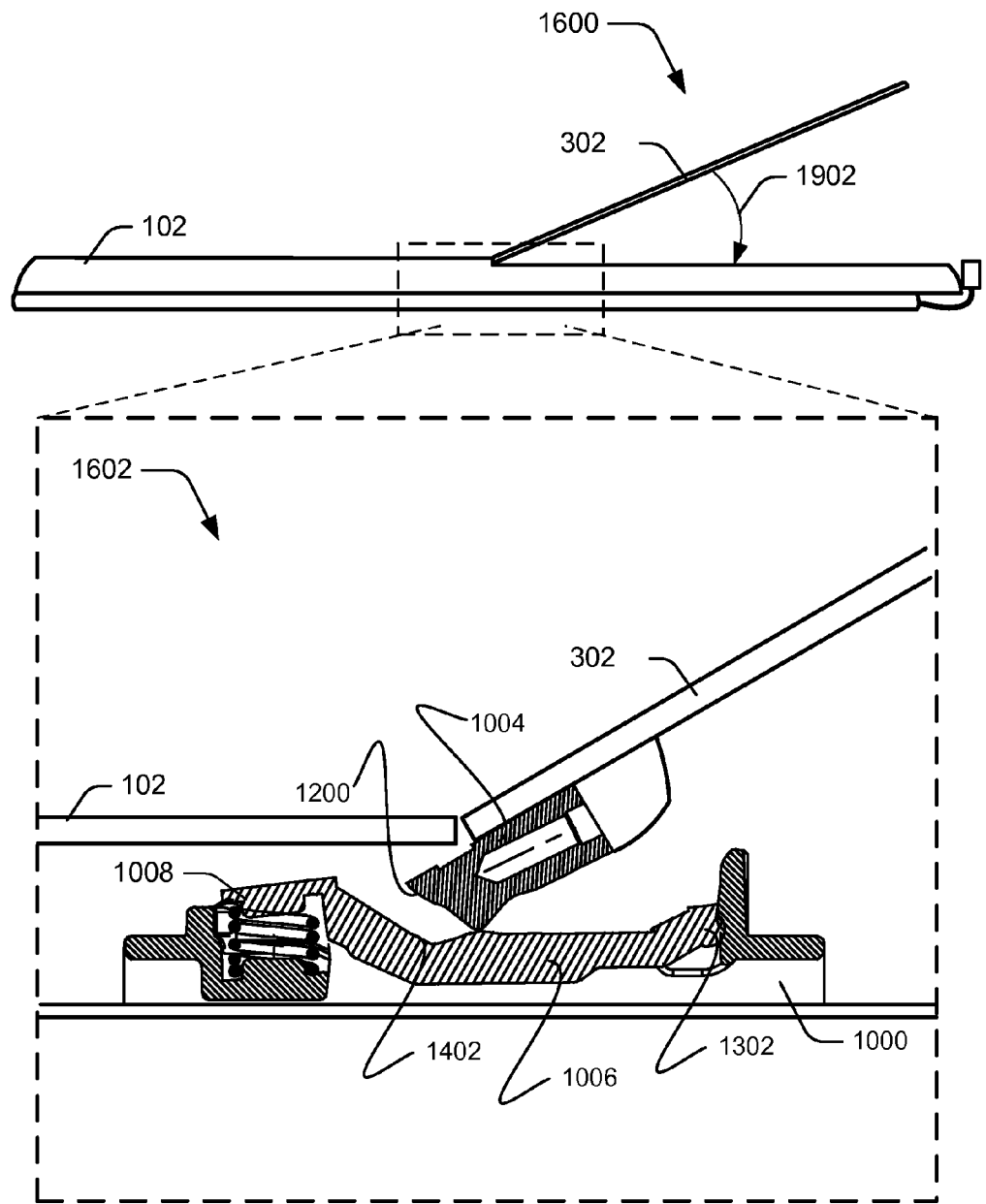
FIG. 16 illustrates a computing device with a kickstand in a partially open position in accordance with one or more embodiments.

FIG. 16 illustrates the computing device 102 with the kickstand 302 in a position 1600. In at least some embodiments, the position 1600 corresponds to a partially open position for the kickstand 302. For instance, the position 1600 can occur when a user begins moving the kickstand 302 from a closed position towards a first present open position.

Further illustrated is a partial side section view 1602 of the computing device 102, including the kickstand 302 attached to the cam 1004 of the hinge 1000 in a partially open position. Similar to the view presented in FIG. 15, the partial section view 1602 illustrates a surface profile of the inner cam surface 1200 of the cam 1004, and a surface profile of the inner follower surface 1402 of the cam follower 1006. While not expressly illustrated here, motion of the cam 1004 is dictated by slidable movement of the guide channel 1204 around the cam guide 1104, discussed above.

Movement of the cam 1004 causes the inner cam surface 1200 to apply pressure to the inner follower surface 1402, and thus pivots the cam follower 1006 downward around the follower pivot 1302 and compresses the hinge spring 1008. For instance, force applied by a user to the kickstand 302 to open the kickstand 302 causes the cam 1004 to rotate within the hinge 1000. During this rotation, the surface profile of the inner cam surface 1200 is such that downward pressure is applied to the inner follower surface 1402, causing the cam follower 1006 to pivot on the follower pivot 1302.

In at least some embodiments, the position 1600 represents a partially open position for the kickstand 302. For instance, if a user releases the kickstand 302 while in the position 1600, the kickstand 302 will snap back to the closed position 1500. When the kickstand 302 is released while in the position 1600, for example, force applied by the hinge spring 1008 against the cam follower 1006 will push against the cam 1004 and cause the cam 1004 to rotate to the closed position 1500 discussed above. However, if the kickstand 302 is opened past a particular position (e.g., angle relative to the computing device 102) and the kickstand is released, the hinge 1000 and thus the kickstand 302 may snap to a first open position, as discussed below.

Figure 17:
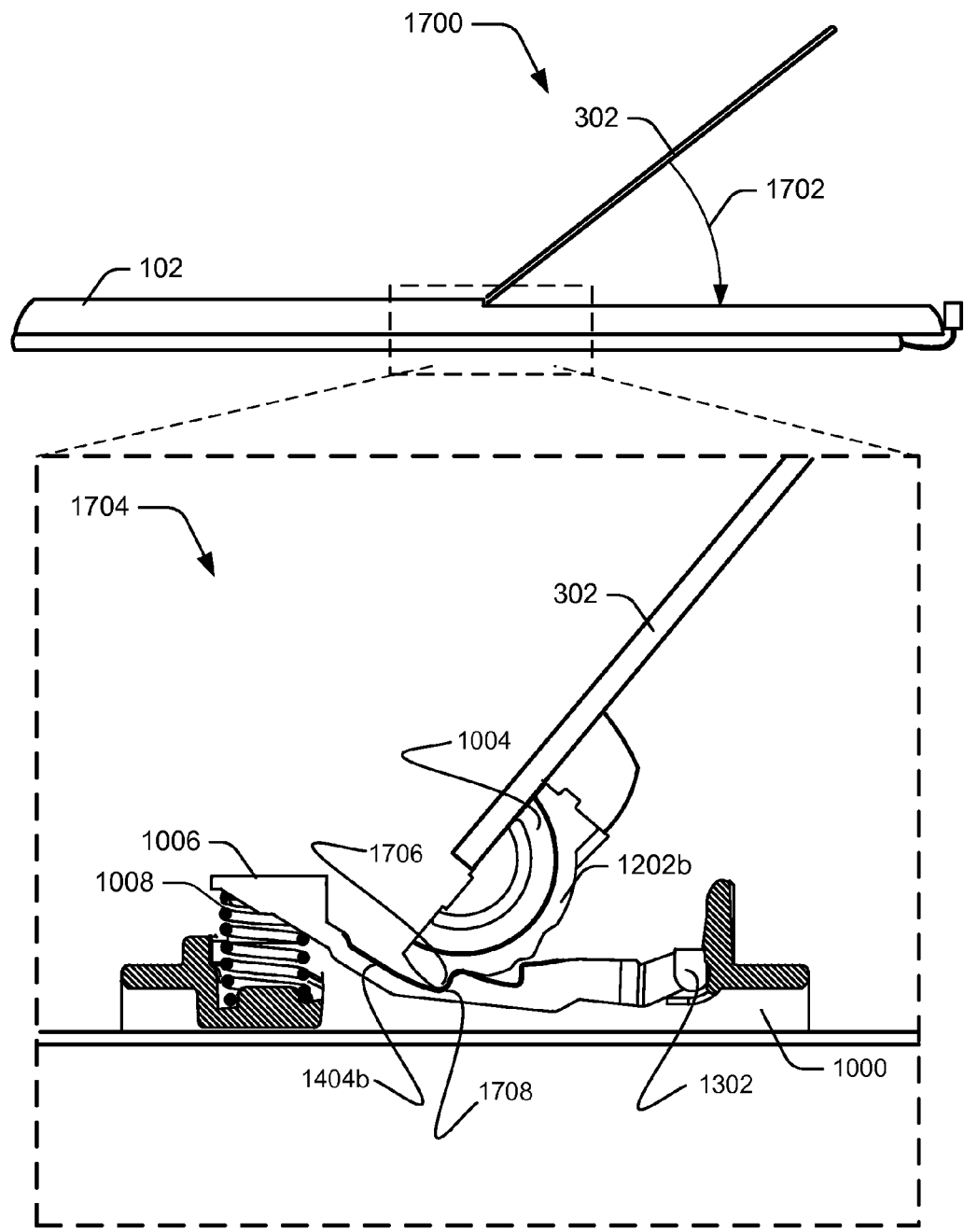
FIG. 17 illustrates a computing device with a kickstand in a first preset open position in accordance with one or more embodiments.

FIG. 17 illustrates the computing device 102 with the kickstand 302 in a position 1700. In at least some embodiments, the position 1700 corresponds to a first preset open position for the kickstand 302. For instance, the position 1700 can occur when a user moves the kickstand 302 past the position 1600 discussed above. Movement past the position 1600, for example, causes the kickstand 302 to snap into the position 1700. In at least some embodiments, the position 1700 is associated with an angle 1702 between the kickstand 302 and the rear surface of the computing device 102. The angle 1702 can be any suitable angle, such as in the range of 45 degrees to 55 degrees.

Further illustrated is a partial side section view 1704 of the computing device 102, including the kickstand 302 attached to the cam 1004 of the hinge 1000 in a first preset open position. In the section view 1704, the cam 1004 is sectioned lengthwise along one side, and thus the illustrated section of the cam 1004 illustrates a surface profile of the outer cam surface 1202*b*, introduced above. The cam follower 1006 is also sectioned lengthwise along one side, and thus the illustrated section of the cam follower 1006 illustrates a surface profile of the outer follower surface 1404*b*, introduced above.

When the kickstand 302 is manipulated past the position 1600 (discussed above), force from the hinge spring 1008 against the cam follower 1006 pushes the cam 1004 into the position 1700. In the position 1700, a cam catch 1706 on the outer cam surface 1202*b* engages with a first follower catch 1708 on the outer follower surface 1404*b*. Generally, the cam catch 1706 and the first follower catch 1708 represent surface features on the outer cam surface 1202*b* and the outer follower surface 1404*b*, respectively.

Engagement of the cam catch 1706 with the first follower catch 1708 enables the kickstand 302 to persist in the preset open position 1700. For instance, spring pressure from the hinge spring 1008 holds the cam catch 1706 against the first follower catch 1708. Absent force directly and/or indirectly applied to the kickstand 302, the cam catch 1706 will not disengage from the first follower catch 1708.

For example, the hinge 1000 is manufactured such that unless a specified threshold force applied to the kickstand 302, the hinge 1000 will not disengage from the preset open position 1700. In at least some embodiments, exceeding the threshold force against the kickstand 302 in one direction can close the kickstand, and exceeding the threshold force against the kickstand 302 in another direction can open the kickstand 302 further.

According to one or more embodiments, contact between the cam 1004 and the cam follower 1006 occurs between the inner cam surface 1200 and the inner follower surface 1402 when the hinge 1000 is in a position from the closed position 1500 to the first preset open position 1700. For instance, for an angle range of 0 degrees (e.g., position 1500) to the first preset open position 1700, the outer cam surfaces 1202a, 1202b do not contact the outer follower surfaces 1404a, 1404b.

However, starting with the first preset open position 1700 and continuing to further open positions such as those discussed below, contact between the cam 1004 and the cam follower 1006 transitions to the outer cam surfaces 1202a, 1202b and the outer follower surfaces 1404a, 1404b. In these further open positions, for example, the inner cam surface 1200 is positioned away from and does not contact the inner follower surface 1402. Thus, as detailed herein, responsiveness of the hinge 1000 between different positions changes based on surface profiles of the different cam and cam follower surfaces, and also based on which surfaces are engaged at a particular position.

Figure 18:
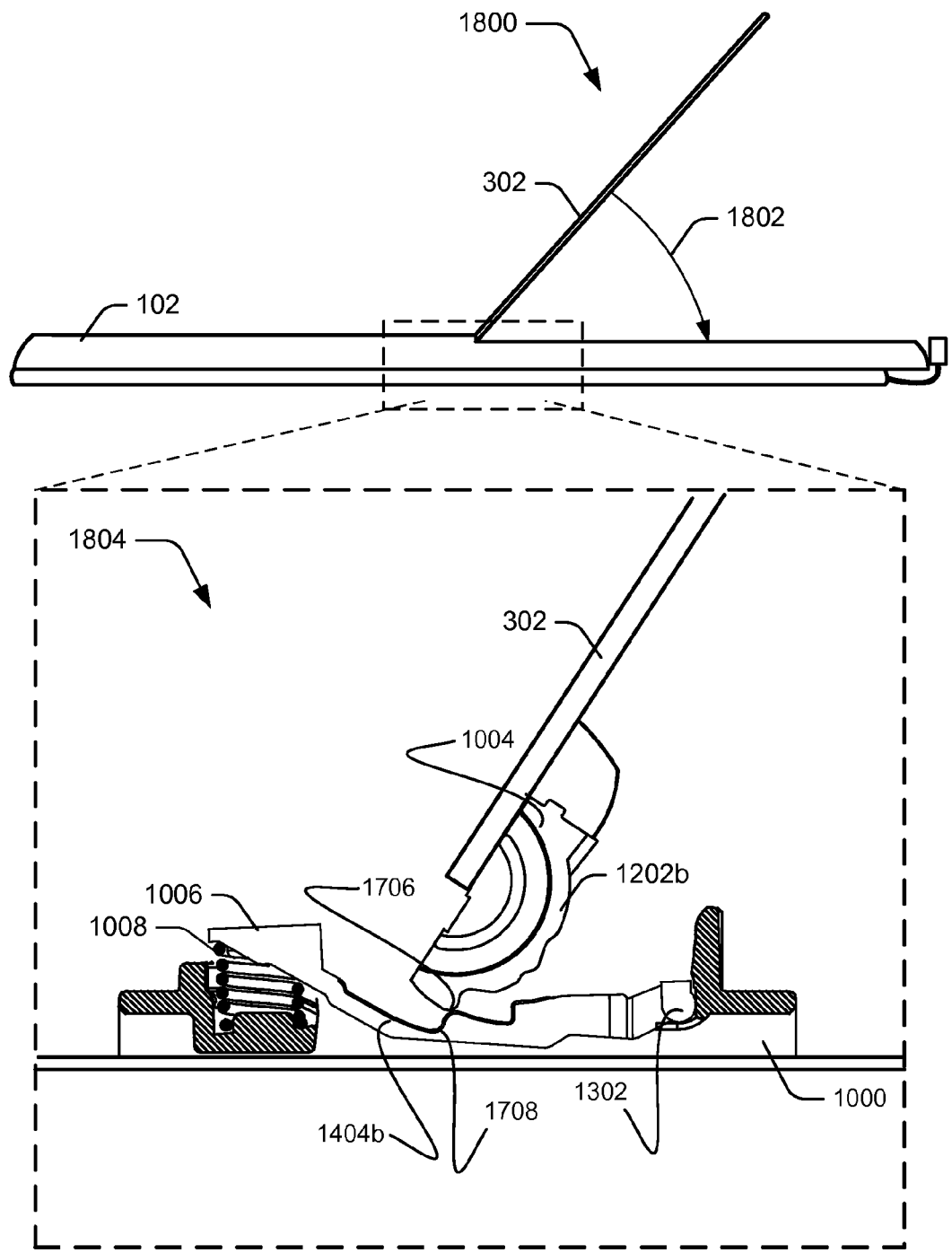
FIG. 18 illustrates a computing device with a kickstand in between preset open positions in accordance with one or more embodiments.

FIG. 18 illustrates the computing device 102 with the kickstand 302 in a position 1800. For instance, the position 1800 can occur when a user moves the kickstand 302 past the position 1700 discussed above. In at least some embodiments, the position 1800 represents an open position that occurs between a first preset open position (e.g., the position 1700, above) and a second preset open position. The position 1800 is associated with an angle 1802 between the kickstand 302 and the rear surface of the computing device 102. The angle 1802 occurs between different preset open positions, such as in a range of 50 degrees to 80 degrees.

Further illustrated is a partial side section view 1804 of the computing device 102, including the kickstand 302 attached to the cam 1004 of the hinge 1000 in the position 1800. In the section view 1804, the cam 1004 is sectioned lengthwise along one side, and thus the illustrated section of the cam 1004 illustrates a surface profile of the outer cam surface 1202b, introduced above. The cam follower 1006 is also sectioned lengthwise along one side, and thus the illustrated section of the cam follower 1006 illustrates a surface profile of the outer follower surface 1404b, introduced above.

In at least some embodiments, movement of the kickstand 302 to the position 1800 occurs when sufficient force is applied to the kickstand 302 away from the computing device 102 such that the cam catch 1706 disengages from the first follower catch 1708. For instance, the force applied by user manipulation of the kickstand 302 overcomes the frictional forces between the cam catch 1706 and the first follower catch 1708, as well as the force exerted by the hinge spring 1008 on the cam follower 1006. Thus, the cam follower 1006 pivots downward on the follower pivot 1302 such that the cam catch 1706 moves away from the first follower catch 1708.

As referenced above, the position 1800 represents an intermediate position, e.g., between preset open positions for the hinge 1000. Thus, in at least some embodiments, if a user releases the kickstand 302 while in the position 1800, the hinge 1000 may snap into a different position. For example, when the kickstand 302 is released while in the position 1800, pressure from the cam follower 1006 against the cam 1004 can cause the hinge 1000 to snap into a previous open position (e.g., the position 1700), or a next open position, such as discussed below. Thus, in at least some embodiments, the hinge 1000 is manufactured such that if the kickstand 302 is released when the cam 1004 is not in a preset position, the cam 1004 will snap into a preset position independent of further user interaction.

Figure 19:
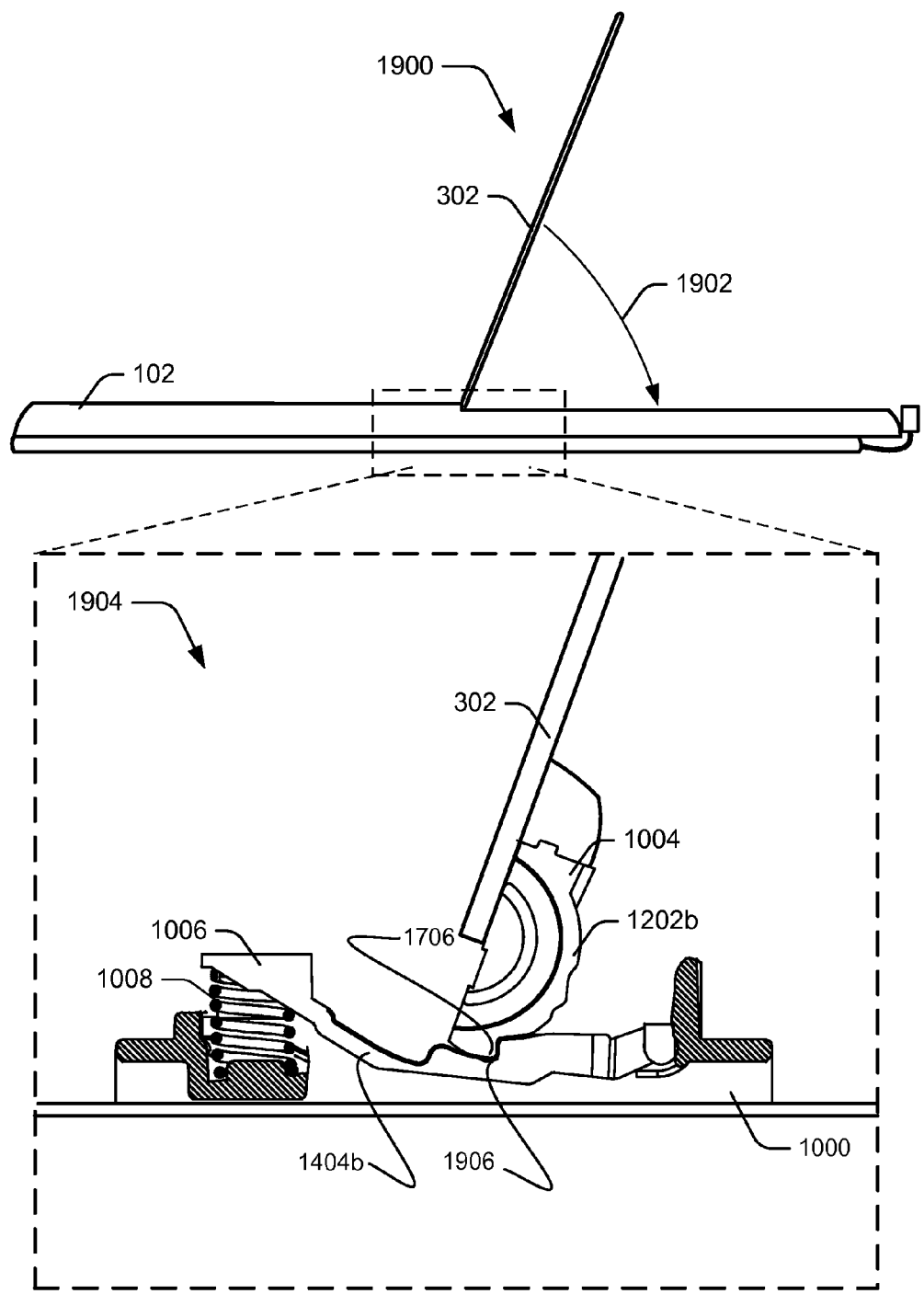
FIG. 19 illustrates a computing device with a kickstand in a second preset open position in accordance with one or more embodiments.

FIG. 19 illustrates the computing device 102 with the kickstand 302 in a position 1900. In at least some embodiments, the position 1900 corresponds to a second preset open position for the kickstand 302. For instance, the position 1900 can occur when a user moves the kickstand 302 past the position 1800 discussed above. Movement past the position 1800, for example, causes the kickstand 302 to snap into the position 1900.

In at least some embodiments, the position 1900 is associated with an angle 1902 between the kickstand 302 and the rear surface of the computing device 102. The angle 1902 can be any suitable angle, such as in the range of 75 degrees to 85 degrees.

Further illustrated is a partial side section view 1904 of the computing device 102, including the kickstand 302 attached to the cam 1004 of the hinge 1000 in a second preset open position. In the section view 1904, the cam 1004 is sectioned lengthwise along one side, and thus the illustrated section of the cam 1004 illustrates a surface profile of the outer cam surface 1202b, introduced above. The cam follower 1006 is also sectioned lengthwise along one side, and thus the illustrated section of the cam follower 1006 illustrates a surface profile of the outer follower surface 1404b, introduced above.

When the kickstand 302 is manipulated past the position 1800 (discussed above), force from the hinge spring 1008 against the cam follower 1006 pushes the cam 1004 into the position 1900. In the position 1900, the cam catch 1706 engages with a second follower catch 1906 on the outer follower surface 1404b. Generally, the second follower catch 1906 represents a surface feature on the outer follower surface 1404b.

Engagement of the cam catch 1706 with the second follower catch 1906 enables the kickstand 302 to persist in the second preset open position 1900. For instance, spring pressure from the hinge spring 1008 holds the cam catch 1706 against the second follower catch 1906. Absent force directly and/or indirectly applied to the kickstand 302, the cam catch 1706 will not disengage from the second follower catch 1906.

For example, the hinge 1000 is manufactured such that unless a specified threshold force and/or forces are applied to the kickstand 302, the hinge 1000 will not disengage from the preset open position 1900. In at least some embodiments, if a threshold force is applied to the kickstand 302 towards the computing device 102, the hinge 1000 may return to the first open position 1700. If a threshold force is applied to the kickstand 302 away from the computing device 102, the cam catch 1706 may disengage from the second follower catch 1906. Consider, for example, the following example scenario.

Figure 20:
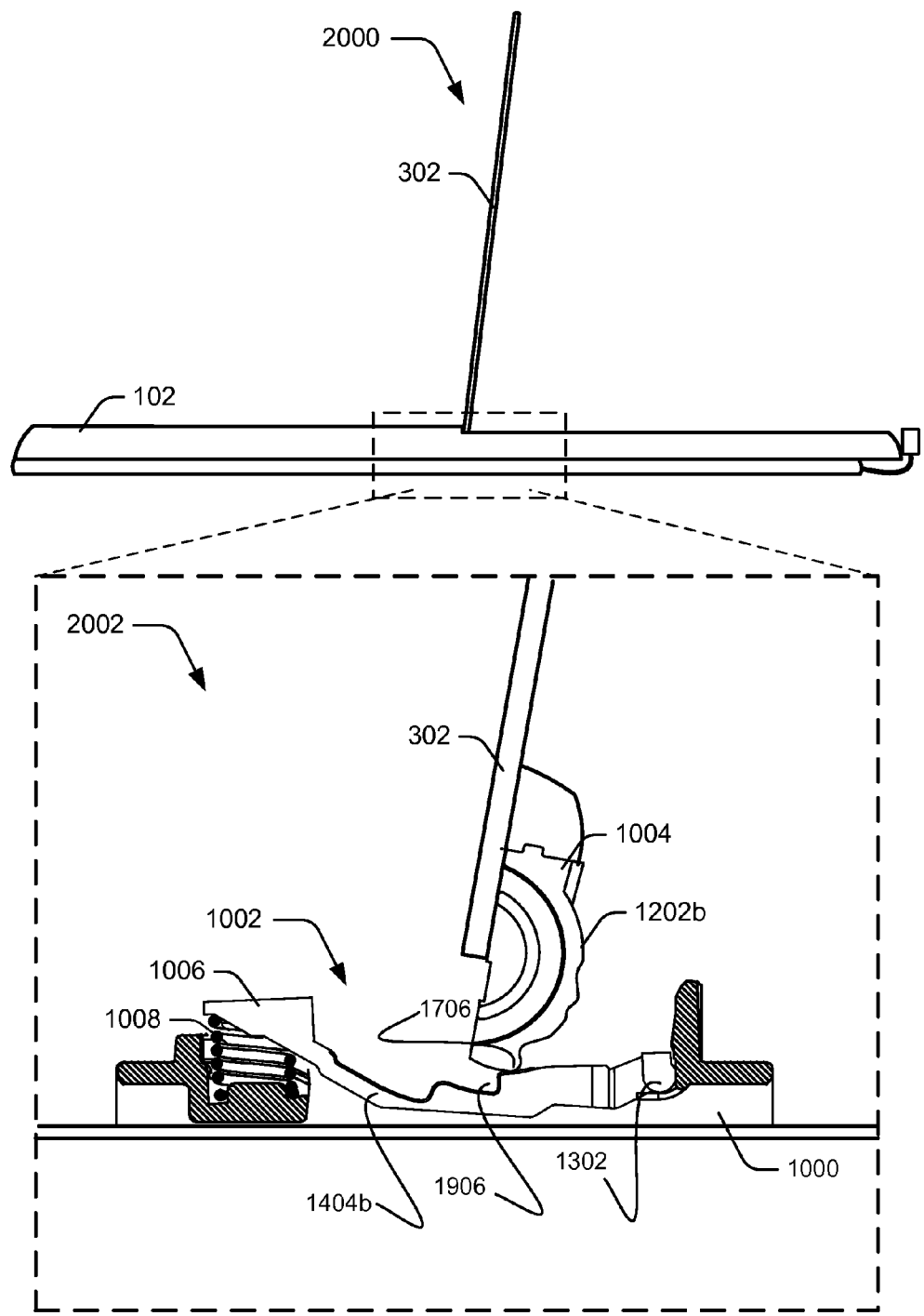
FIG. 20 illustrates a computing device with a kickstand in an emergency escape position in accordance with one or more embodiments.

FIG. 20 illustrates the computing device 102 with the kickstand 302 in a position 2000. For instance, the position 2000 can occur when a user moves the kickstand 302 past the position 1900 discussed above.

Further illustrated is a partial side section view 2002 of the computing device 102, including the kickstand 302 attached to the cam 1004 of the hinge 1000 in the position 2000. In the section view 2002, the cam catch 1706 has disengaged from the second follower catch 1906. In at least some embodiments, movement of the kickstand 302 to the position 2000 occurs when sufficient force is applied to the kickstand 302 away from the computing device 102 such that the cam catch 1706 disengages from the second follower catch 1906. For instance, the force applied by user manipulation of the kickstand 302 overcomes the frictional forces between the cam catch 1706 and the second follower catch 1906, as well as the force exerted by the hinge spring 1008 on the cam follower 1006. Thus, the cam follower 1006 pivots downward on the follower pivot 1302 such that the cam catch 1706 moves away from the second follower catch 1906.

In at least some embodiments, the position 2000 represents an "emergency position" for the kickstand 302. The position 2000, for example, is not intended to be a standard operational position for the kickstand 302. For instance, the position 2000 may occur when a user inadvertently applies excessive force to the kickstand 302 and/or the computing device 102 while the kickstand 302 is in the second preset open position 1900. In such a scenario, the hinge 1000 may allow the kickstand 302 to move to the position 2000, thus avoiding damage to the kickstand 302 and/or the hinge 1000.

According to one or more implementations, the cam 1004/kickstand 302 may remain engaged in the hinge frame 1002 while in the position 2000. Alternatively, movement of the hinge 1000 to the position 2000 may cause the cam 1004/kickstand 302 to become disengaged from the hinge frame 1002 such that the cam 1004/kickstand 302 are detached from the body of the computing device 102. In such a scenario, the cam 1004 may be reinserted into the hinge frame 1002 to return to an operational state. For instance, a user may reinsert the cam 1004 into the hinge frame 1002 and reengage the cam 1004 with one of the preset open positions and/or the closed position for the kickstand 302.

Thus, the position 2000 represents an emergency escape position that enables the hinge 1000/kickstand 302 to recover from an overload situation that may occur when excessive force is applied to the kickstand 302.

Figure 21:
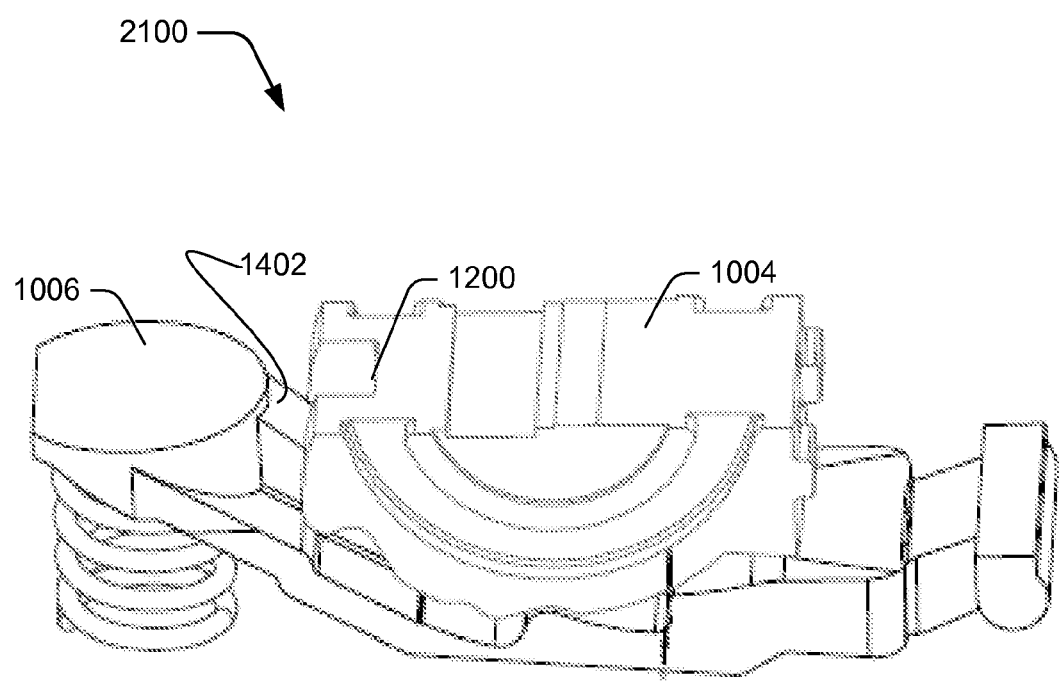
FIG. 21 illustrates an example interaction between a hinge cam and a cam follower in accordance with one or more embodiments.

FIG. 21 illustrates an example position 2100 of the cam 1004 relative to the cam follower 1006. The position 2100, for instance, corresponds to a closed position for the hinge 1000, such as discussed above with reference to FIG. 15. For ease of discussion, the position 2100 is illustrated without the hinge frame 1002 and other portions an associated apparatus.

Notice in the position 2100 that the inner follower surface 1402 of the cam follower 1006 engages within the channel formed in the cam 1004 by the inner cam surface 1200. This engagement between the cam 1004 and the cam follower 1006 creates a stable structure that resists lateral movement of a component that is attached to the cam 1004. For instance, the "U-shaped" profile of the cam 1004 engages with the "T-shaped" profile of the cam follower 1006 to realize a stable yet moveable integrated structure. Further, the shape of the individual components provides for enhanced strength of the components themselves. For instance, "U-shaped" cross-sectional profile of the cam 1004 and the "T-shaped cross-sectional profile of the cam follower 1006 are similar to structural beams, thus imbuing the respective components with enhanced rigidity to resist bending.

Having discussed some example kickstand and hinge positions, consider now a discussion of an example responsiveness profile associated with movement between the different positions.

Hinge Response Profile

Considering the different positions of the hinge 1000 and the kickstand 302 discussed above, the response profile experienced during movement of the kickstand 302 between the different positions is influenced by various factors. For instance, pressure from the hinge spring 1008 against the cam follower 1006 and thus the cam 1004 provides pressure against the various components. Depending on which position the components are in, the pressure either resists or encourages movement of the components.

Further, interaction between the different surfaces of the cam 1004 and the cam follower 1006 contributes to the responsiveness profile. For instance, when the kickstand 302 moves from the closed position 1500 to the first open position 1700, movement of the hinge 1000 is determined by contact between the inner cam surface 1200 and the inner follower surface 1402. When the kickstand moves past the first open position 1700, movement of the hinge 1000 is determined by contact between the outer cam surfaces 1202a, 1202b and the outer follower surfaces 1404a, 1404b. Thus, a transition between guiding surfaces occurs at the first open position 1700.

In at least some embodiments, responsiveness of the hinge 1000 can be characterized via a torque profile that indicates various forces that occur during movement of the kickstand 302 between various positions. For instance, interaction between the different cam surfaces and the different cam follower surfaces provides a detent mechanism that results in a tactile response profile for movement of the kickstand 302 between different preset positions. Consider, for example, the following example torque profile.

Figure 22:
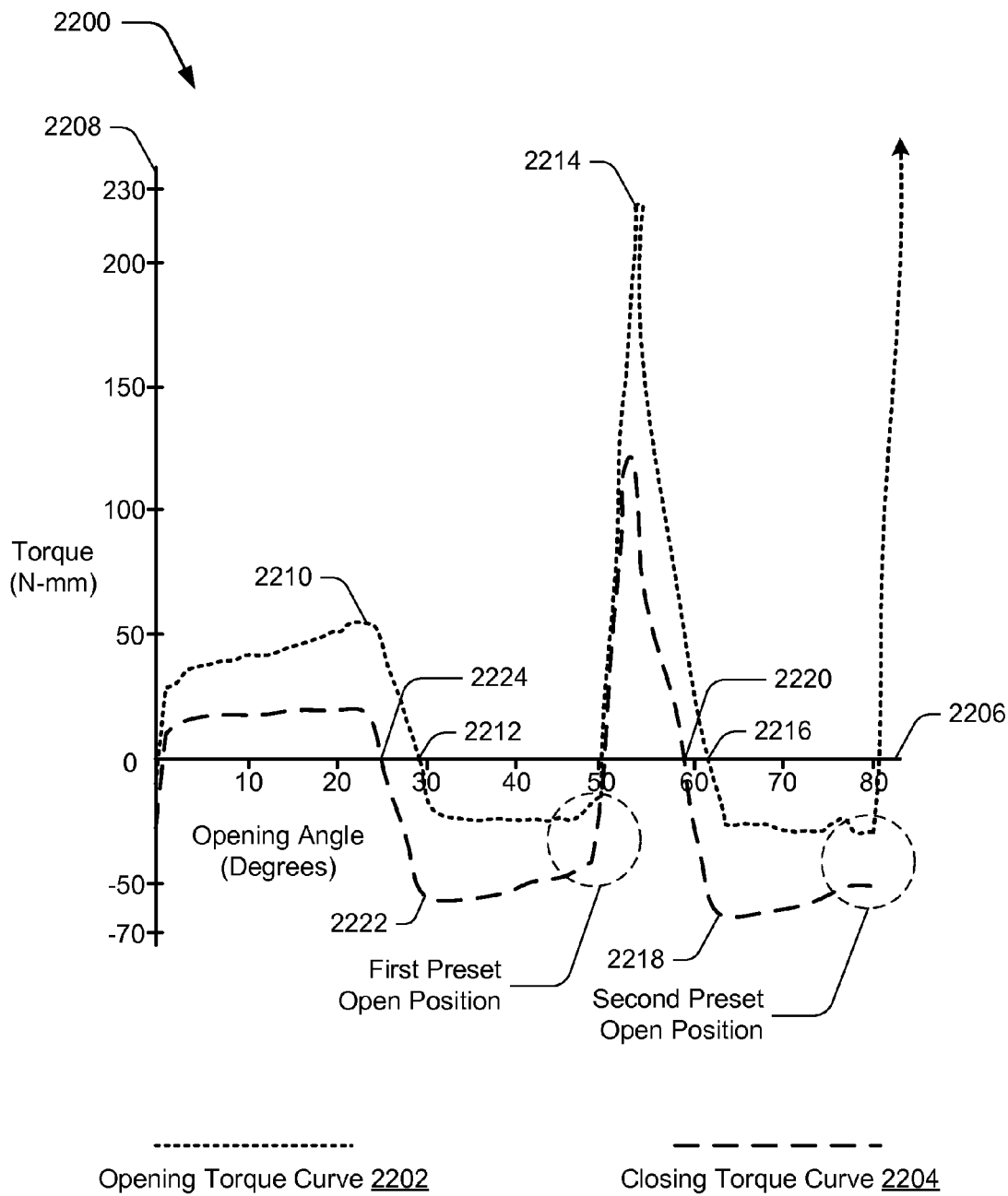
FIG. 22 illustrates a torque graph that shows torque forces that occur in a hinge mechanism in accordance with one or more embodiments.

FIG. 22 illustrates a torque graph 2200 that includes an opening torque curve 2202 and a closing torque curve 2204 according to one or more embodiments. The torque graph 2200 further includes an angle axis 2206 and a torque axis 2208. The angle axis 2206 (e.g., the x-axis) indicates opening angle values for the kickstand 302 relative to an associated apparatus, e.g., the computing device 102. The torque axis 2208 (e.g., the y-axis) indicates different torque values for the torque graph 2200. In this particular example, the torque values are indicated in Newton-millimeters (N-mm) This is not to be interpreted as limiting, however, and torque values may be measured in a variety of different units. Further, different forces may be measured to characterize the movement of the hinge 1000 and/or the kickstand 302.

According to one or more embodiments, the opening torque curve 2202 represents torque transferred from the kickstand 302 to the cam 1004 when the kickstand is moved (e.g., via user manipulation) from a closed position to various open positions. The closing torque curve 2204 represents torque transferred from the kickstand 302 to the cam 1004 when the kickstand is moved (e.g., via user manipulation) from various open positions towards a closed position.

As further detailed below, the different torque curves are associated with certain "action points" or "action regions" that demonstrate the overall responsiveness profile of the hinge mechanisms discussed herein. The opening torque curve 2202, for instance, includes a first opening peak 2210, a first opening threshold 2212, a second opening peak 2214, and a second opening threshold 2216. The closing torque curve 2204 includes, for example, a first closing peak 2218, a first closing threshold 2220, a second closing peak 2222, and a second closing threshold 2224. Example attributes of these different points/regions are now discussed.

As an example implementation, consider that the kickstand 302 is in a closed position, e.g., 0 degrees on the torque graph 2200. A user manipulates the kickstand 302 from the closed position towards an open position. Following the opening torque curve 2202, torque against opening of the kickstand 302 gradually increases until the opening torque curve 2202 reaches a first opening peak 2210 at an open position of about 24 degrees. After the first opening peak 2210, torque values rapidly decrease until the opening torque curve 2202 intersects the angle axis 2206 at a first opening threshold 2212. In this particular example, the first opening threshold 2212 represents an open position of approximately 29 degrees.

According to one or more embodiments, if the kickstand 302 is released prior to reaching the second closing threshold 2224 (e.g., at less than 25 degrees open), the kickstand will snap back to closed, e.g., 0 degrees. Further, if the kickstand 302 is released after the first opening threshold 2212, the kickstand 302 will snap to a first preset open position, e.g., at 50 degrees. Thus, the first opening threshold 2212 represents a threshold open position that when exceeded, allows the kickstand 302 to snap into a first preset open position.

If the second closing threshold 2224 is not exceeded and the kickstand 302 is released, the kickstand will snap back into a closed position. For instance, if a user releases the kickstand at an open angle less than the second closing threshold 2224, torque active on the cam 1004 is characterized by the closing torque curve 2204.

Consider now that a user further manipulates the kickstand from the first open position (e.g., at 50 degrees) towards a further open position. Continuing from 50 degrees on the opening torque curve 2202, it can be seen that torque values rapidly increase to a second opening peak 2214. In at least some embodiments, this increase in torque represents a threshold torque required to move the kickstand from a first preset open position (e.g., the position 1700) to a second preset open position, e.g., the position 1900. For instance, the second opening peak 2214 represents the torque required to disengage the cam catch 1706 from the first follower catch 1708, as illustrated above with reference to FIGS. 18 and 19. In this particular example, the threshold torque represented by the second opening peak 2214 is around 220 N-mm.

If a user manipulates the kickstand 302 past the second opening peak 2214, it can be seen that the torque values of the opening torque curve 2202 rapidly decrease until the opening torque curve 2202 intersects the angle axis 2206 at a second opening threshold 2216. In this particular example, the second opening threshold 2216 represents an open position of approximately 62 degrees. According to one or more embodiments, if the kickstand 302 is released prior to reaching the first closing threshold 2220 (e.g., between the first preset open position and the first closing threshold 2220), the kickstand will snap back to the first preset open position. If the kickstand 302 is released after the second opening threshold 2216, the kickstand 302 will snap to a second preset open position, e.g., at 80 degrees. Thus, the second opening threshold 2216 represents a threshold open position that when exceeded, allows the kickstand 302 to snap into the second preset open position. In at least some embodiments, the second preset open position represents the position 1900 discussed above.

Continuing past the second preset open position at 80 degrees, it can be seen that the torque values rapidly increase past the previous torque values. In at least some embodiments, this indicates that the kickstand 302 is not intended to be opened past the second preset open position (e.g., 80 degrees) under normal operating scenarios. For instance, opening the kickstand past the second preset open position is based on an emergency release scenario, such as discussed above with reference to FIG. 20.

When closing the kickstand 302 from the open position 1900 and/or other open position, torque acting on the cam 1004 is characterized by the closing torque curve 2204. Generally, the interpretation of the closing torque curve 2204 is opposite that of the opening torque curve 2202 since the direction of motion (e.g., closing vs. opening) is reversed. In at least some embodiments, for example, negative torque values on the closing torque curve 2204 represent closing torque applied by the user, and positive torque values on the closing torque curve 2204 represent the tendency of the kickstand to snap into a position (e.g., an open position or closed) absent resistance from a user.

For instance, consider that a user manipulates the kickstand 302 from the second preset open position of 80 degrees towards a closed position. Traversing the closing torque curve 2204 from the second preset open position, it can be seen that the torque forces that occur when closing the kickstand 302 are less than those that occur when opening the kickstand 302.

As referenced above, the closing torque curve 2204 includes the first closing peak 2218, which represents a threshold torque force required to move the kickstand 302 from the second preset open position to the first open position. When the kickstand is closed past the first closing peak 2218, the closing torque resistance rapidly decreases until the closing torque curve 2204 intersects the angle axis 2206 at the first closing threshold 2220. In this particular example, the first closing threshold 2220 represents an open angle of approximately 58 degrees. According to one or more embodiments, if a user releases the kickstand 302 between the second preset open position and prior to reaching the second opening threshold 2216, the kickstand 302 will snap back into the second preset open position. However, if the user releases the kickstand 302 after reaching the first closing threshold 2220 (e.g., at or less than about 58 degrees), the kickstand 302 will snap into the first preset open position.

The second closing peak 2222 represents a threshold torque required to close the kickstand 302, e.g., to transition from the first preset open position to the closed position. When the kickstand is closed past the second closing peak 2222, the closing torque resistance rapidly decreases until the closing torque curve 2204 intersects the angle axis 2206 at the second closing threshold 2224. In this particular example, the second closing threshold 2224 represents an open angle of approximately 25 degrees.

In at least some embodiments, if a user releases the kickstand 302 between the first open position 1700 and prior to reaching the first opening threshold 2212, the kickstand 302 will snap back into the first preset open position. However, if the user releases the kickstand 302 after reaching or exceeding the second closing threshold 2224 (e.g., at or less than about 25 degrees), the kickstand 302 will snap into the closed position.

As illustrated in FIG. 22, the spaces (e.g. differences) between the opening thresholds and the closing thresholds are minimized. For instance, the difference between the first opening threshold 2212 and the second closing threshold 2224 is minimized. Further, the difference between the second opening threshold 2216 and the first closing threshold 2220 is minimized. This contributes to the "snappiness" of the kickstand when moved between different positions, and reduces the likelihood that the kickstand will stick in an unintended position, e.g., outside of one of the preset open positions.

As further illustrated by the torque graph 2200, the hinge mechanism discussed herein is designed to minimize the torque required to maintain the "snappiness" response. In at least some embodiments, this minimum torque is approximately 20 N-mm. Further, the opening torque curve 2202 and the closing torque curve 2204 are trapezoidal in shape, for example, as opposed to sinusoidal curves. This illustrates the snappy transition between the different preset hinge positions.

Thus, in at least some embodiments, the torque curves characterize torque values that apply during movement of the kickstand 302. For instance, the opening torque curve 2202 represents the torque that is applied when opening the kickstand 302 from the closed position 1500 through the various different open positions. Further, the closing torque curve 2204 represents the torque that is applied when closing the kickstand 302 from various open positions to the closed position 1500. It should be noted that in the closing torque curve 2204, a negative torque represents the user actively applying torque to close the kickstand. A positive torque represents the kickstand tending to close itself, or snapped closed.

Accordingly, embodiments discussed herein provide a stable hinge mechanism that enables an attached component (e.g., a kickstand) to be adjusted between multiple preset positions. It is to be appreciated that the example device orientations, kickstand positions, hinge positions, hinge preset positions, torque values, and so forth discussed above are presented for purposes of example only. Thus, a wide variety of different device orientations, kickstand positions, hinge positions, hinge preset positions, and torque values not specifically mentioned herein may be implemented within the spirit and scope of the claimed embodiments.

For instance, an attachment mechanism used to attach a kickstand to a computing device (e.g., the hinge 1000 discussed above) can include any number and/or configuration of suitable preset stop positions to enable the kickstand to be opened to a variety of different positions to support various orientations of a computing device. Further, example hinges can be attached at any suitable position and/or portion of a kickstand and/or computing device in accordance with the claimed embodiments.

Example System and Device

Figure 23:
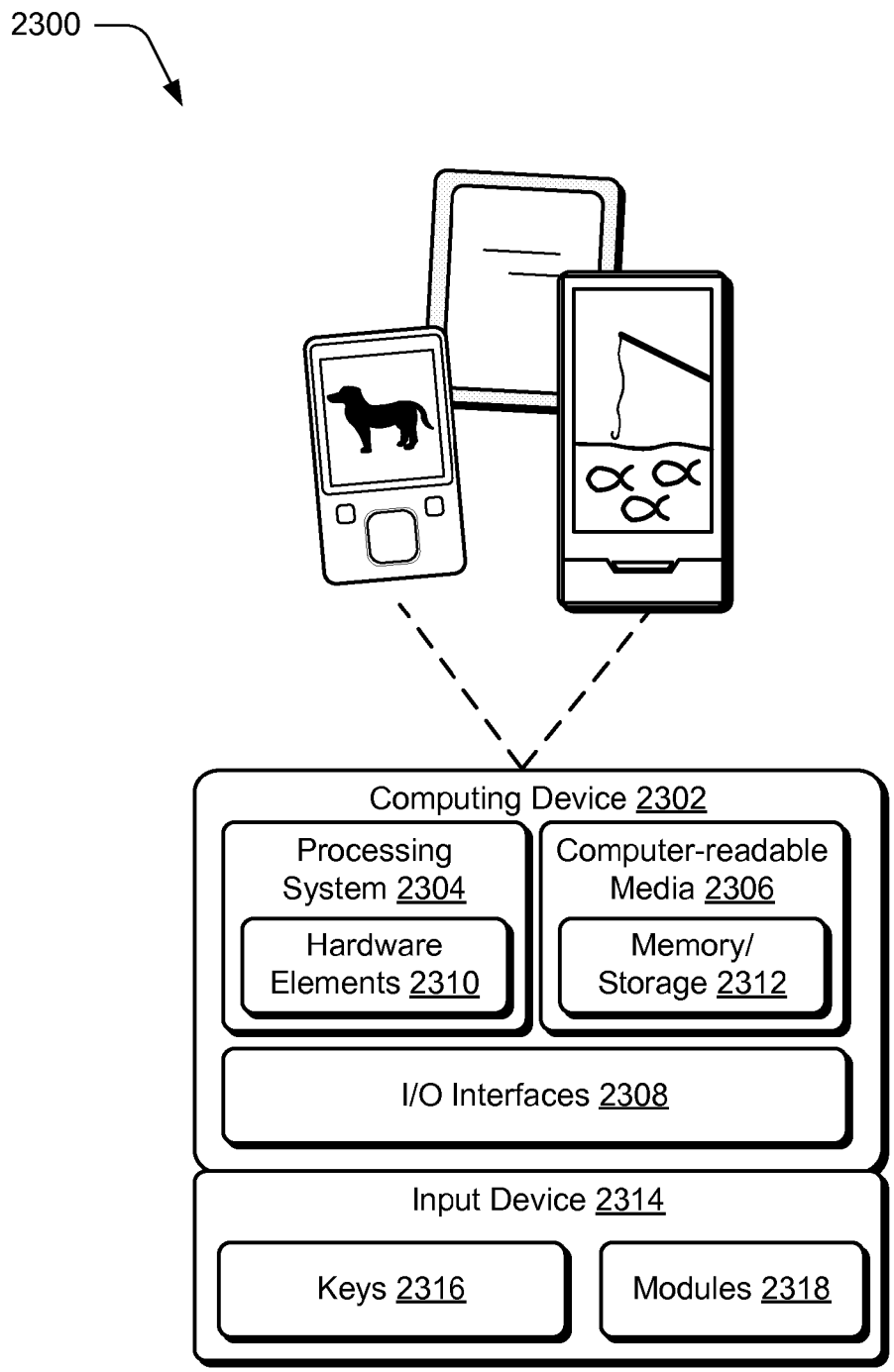
FIG. 23 illustrates an example system including various components of an example device that can be implemented as any type of computing device as described with reference to FIGS. 1-22 to implement embodiments of the techniques described herein.

FIG. 23 illustrates an example system generally at 2300 that includes an example computing device 2302 that is representative of one or more computing systems and/or devices that may implement the various techniques described herein. The computing device 2302 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 2302 as illustrated includes a processing system 2304, one or more computer-readable media 2306, and one or more I/O interface 2308 that are communicatively coupled, one to another. Although not shown, the computing device 2302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2304 is representative of functionality to perform one or more operations using hardware. Accordingly, the processing system 2304 is illustrated as including hardware element 2310 that may be configured as processors, functional blocks, and so forth. This may include implementation in hardware as an application specific integrated circuit or other logic device formed using one or more semiconductors. The hardware elements 2310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2306 is illustrated as including memory/storage 2312. The memory/storage 2312 represents memory/storage capacity associated with one or more computer-readable media. The memory/storage component 2312 may include volatile media (such as random access memory (RAM)) and/or nonvolatile media (such as read only memory (ROM), Flash memory, optical disks, magnetic disks, and so forth). The memory/storage component 2312 may include fixed media (e.g., RAM, ROM, a fixed hard drive, and so on) as well as removable media (e.g., Flash memory, a removable hard drive, an optical disc, and so forth). The computer-readable media 2306 may be configured in a variety of other ways as further described below.

Input/output interface(s) 2308 are representative of functionality to allow a user to enter commands and information to computing device 2302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2302 may be configured in a variety of ways to support user interaction.

The computing device 2302 is further illustrated as being communicatively and physically coupled to an input device 2314 that is physically and communicatively removable from the computing device 2302. In this way, a variety of different input devices may be coupled to the computing device 2302 having a wide variety of configurations to support a wide variety of functionality. In this example, the input device 2314 includes one or more keys 2316, which may be configured as pressure sensitive keys, mechanically switched keys, and so forth.

The input device 2314 is further illustrated as include one or more modules 2318 that may be configured to support a variety of functionality. The one or more modules 2318, for instance, may be configured to process analog and/or digital signals received from the keys 2316 to determine whether a keystroke was intended, determine whether an input is indicative of resting pressure, support authentication of the input device 2314 for operation with the computing device 2302, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2310 and computer-readable media 2306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2310. The computing device 2302 may be configured to implement particular instructions and/or functions corresponding to the software and/or hardware modules. Accordingly, implementation of a module that is executable by the computing device 2302 as software may be achieved at least partially in hardware, e.g., through use of computer-readable storage media and/or hardware elements 2310 of the processing system 2304. The instructions and/or functions may be executable/operable by one or more articles of manufacture (for example, one or more computing devices 2302 and/or processing systems 2304) to implement techniques, modules, and examples described herein.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising: a support component movably attached to a rear portion of a mobile device; and at least one hinge that attaches a portion of the support component to the mobile device, the hinge being configured with at least two preset open positions such that the support component is positionable relative to the mobile device according to the two or more preset open positions, and such that the hinge causes the support component to snap into one or more of the preset open positions when the support component is released in a position between the preset open positions, the hinge including: a cam that attaches the support component to the hinge, the cam being movably engaged with a cam follower within the hinge to assume the preset open positions; and a release feature such that if the support component is opened past a last preset open position, the support component is detached from the mobile device.

2. An apparatus as recited in claim 1, wherein the cam follower is positioned against the cam and that applies pressure from a hinge spring against the cam, a surface profile of the cam and a surface profile of the cam follower being such that variable torque forces occur when transitioning between the preset open positions.

3. An apparatus as recited in claim 2, wherein an inner surface of the cam follower engages within an inner channel of the cam to stabilize the hinge.

4. An apparatus as recited in claim 3, wherein the cam has a U-shaped cross-sectional profile and the cam follower has a T-shaped cross-sectional profile.

5. An apparatus as recited in claim 1, wherein the hinge comprises: a hinge frame with the cam slidably mounted on a cam guide on an interior surface of the hinge frame, the cam including an inner cam surface and at least one outer cam surface; the cam follower pivotably mounted within the hinge frame and positioned in contact with the cam, the cam follower including an inner follower surface configured to engage with the inner cam surface, and at least one outer follower surface configured to engage with the at least one outer cam surface; and a hinge spring mounted within the hinge frame and that applies force to the cam follower such that the cam follower is held in contact with the cam.

6. An apparatus as recited in claim 5, wherein the hinge is configured such that during movement of the cam, contact between the cam and the cam follower transitions between contact between the inner cam surface and the inner follower surface, to contact between the at least one outer cam surface and the at least one outer follower surface.

7. A hinge comprising: a hinge frame with a cam slidably mounted on a cam guide on an interior surface of the hinge frame, the cam including an inner cam surface and at least one outer cam surface; a cam follower pivotably mounted within the hinge frame and positioned in contact with the cam, the cam follower including an inner follower surface configured to engage with the inner cam surface, and at least one outer follower surface configured to engage with the at least one outer cam surface; and a hinge spring mounted within the hinge frame and that applies force to the cam follower such that the cam follower is held in contact with the cam, the hinge being configured to attach a support component to a computing device to enable the computing device to be positioned in different orientations relative to an adjacent surface, the hinge being further configured such that during movement of the cam, contact between the cam and the cam follower transitions between contact between the inner cam surface and the inner follower surface, to contact between the at least one outer cam surface and the at least one outer follower surface, thus enabling the hinge to snap into multiple preset open positions when the support component is released in a position between the multiple preset open positions.

8. A hinge as recited in claim 7, wherein the outer cam surface and the at least one outer follower surface include surface features that enable the cam to be positioned at the multiple preset open positions.

9. A hinge as recited in claim 7, wherein the cam has a U-shaped cross-sectional profile and the cam follower has a T-shaped cross-sectional profile.

10. A hinge as recited in claim 7, wherein the computing device includes a display, and wherein the different orientations present the display at different angles relative to the adjacent surface.

11. A hinge as described in claim 7, wherein the cam follower applies pressure from the hinge spring against the cam, a surface profile of the cam and a surface profile of the cam follower being such that variable torque forces occur when transitioning between the multiple preset open positions.

12. A computing device comprising: a chassis; and at least one hinge that attaches a support component to the chassis such that the support component is positionable via the at least one hinge at multiple preset open positions, the at least one hinge being configured such that if the support component is released between a first preset open position and a second open preset position, the support component snaps into one of the first present open position or the second preset open position, the at least one hinge enabling the computing device to be positioned in different orientations relative to an adjacent surface, the at least one hinge including: a cam that attaches the support component to the at least one hinge; and a cam follower positioned against the cam and that applies pressure from a hinge spring against the cam, a surface profile of the cam and a surface profile of the cam follower being such that variable torque forces occur when transitioning between the preset open positions, the variable torque forces causing the support component to snap into one of the first preset open position or the second preset open position.

13. A computing device as described in claim 12, wherein: the cam includes an inner cam surface and at least one outer cam surface; the cam follower includes an inner follower surface and at least one outer follower surface; and during movement of the at least one hinge from a closed position to the first preset open position, contact between the cam and the cam follower transitions from contact between the inner cam surface and the inner follower surface, to contact between the at least one outer cam surface and the at least one outer follower surface.

14. A computing device as described in claim 13, wherein the at least one outer surface of the cam includes a cam catch that engages with surface features of the at least one outer follower surface to hold the support component at one or more of the first preset open position or the second preset open position.

15. A computing device as described in claim 13, wherein at least one of the first preset open position or the second preset open position enables the support component to support the chassis at different angles relative to an adjacent surface.

16. A computing device as described in claim 12, wherein a torque profile that applies to movement of the at least one hinge between the multiple preset open positions is such that movement from the first preset open position to the second preset open position requires a higher torque applied to the support component than movement from the second preset open position to the first preset open position.

17. A computing device as described in claim 12, wherein an inner surface of the cam follower engages within an inner channel of the cam to stabilize the at least one hinge.

18. A computing device as described in claim 17, wherein: the cam follower is pivotably mounted within the hinge frame; and the inner surface of the cam follower is configured to engage with an inner cam surface of the cam, and at least one outer follower surface of the cam follower is configured to engage with at least one outer cam surface of the cam.

19. A computing device as described in claim 12, wherein: the cam is slidably mounted on a cam guide on an interior surface of a hinge frame of the at least one hinge; and the hinge spring is mounted within the hinge frame and applies force to the cam follower such that the cam follower is held in contact with the cam.

20. A computing device as described in claim 12, wherein the cam has a U-shaped cross-sectional profile and the cam follower has a T-shaped cross-sectional profile.

* * * * *